United States Patent
Jung et al.

(10) Patent No.: US 11,985,660 B2
(45) Date of Patent: May 14, 2024

(54) METHOD AND APPARATUS FOR TRANSMITTING AND RECEIVING FEEDBACK INFORMATION IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Nam Ho Hur, Daejeon (KR); Seok Ki Ahn, Daejeon (KR); Sung Jun Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 268 days.

(21) Appl. No.: 17/495,568

(22) Filed: Oct. 6, 2021

(65) Prior Publication Data
US 2022/0116973 A1  Apr. 14, 2022

(30) Foreign Application Priority Data

| Oct. 8, 2020 | (KR) | .......................... | 10-2020-0130546 |
| Dec. 9, 2020 | (KR) | .......................... | 10-2020-0171777 |
| Mar. 31, 2021 | (KR) | .......................... | 10-2021-0042179 |
| May 11, 2021 | (KR) | .......................... | 10-2021-0060494 |
| Jul. 30, 2021 | (KR) | .......................... | 10-2021-0100804 |
| Sep. 14, 2021 | (KR) | .......................... | 10-2021-0122795 |

(51) Int. Cl.
*H04W 72/04* (2023.01)
*H04L 1/1812* (2023.01)
*H04L 5/00* (2006.01)
*H04W 72/0446* (2023.01)
*H04W 72/12* (2023.01)
(Continued)

(52) U.S. Cl.
CPC ....... *H04W 72/1273* (2013.01); *H04L 1/1819* (2013.01); *H04L 5/0053* (2013.01); *H04W 72/0446* (2013.01); *H04W 72/23* (2023.01); *H04W 72/569* (2023.01)

(58) Field of Classification Search
None
See application file for complete search history.

(56) References Cited

U.S. PATENT DOCUMENTS 10,680,781 B2    6/2020  Li et al.
2017/0303248 A1*  10/2017  Chatterjee ............. H04W 72/23
(Continued)

FOREIGN PATENT DOCUMENTS

| WO | WO2019031850 A1 | 2/2019 |
| WO | WO2019225952 A1 | 11/2019 |

*Primary Examiner* — Sai Aung

(57) ABSTRACT

An operation method of a terminal in a communication system may comprise: receiving, from a base station, a higher layer message including information indicating that first DCI including a HARQ feedback enabled/disabled indicator is configured; receiving the first DCI from the base station; receiving first downlink data from the base station based on first scheduling information included in the first DCI; and determining whether to transmit a first HARQ response for the first downlink data based on the HARQ feedback enabled/disabled indicator included in the first DCI.

17 Claims, 10 Drawing Sheets

(51) Int. Cl.
*H04W 72/1273* (2023.01)
*H04W 72/23* (2023.01)
*H04W 72/566* (2023.01)

(56) References Cited

U.S. PATENT DOCUMENTS

| | | | |
|---|---|---|---|
| 2017/0373802 A1* | 12/2017 | Bergström | H04L 1/0027 |
| 2019/0058554 A1* | 2/2019 | Liao | H04L 1/1864 |
| 2019/0132141 A1 | 5/2019 | Li et al. | |
| 2020/0022175 A1 | 1/2020 | Xiong et al. | |
| 2020/0044791 A1* | 2/2020 | Tsai | H04L 1/1854 |
| 2020/0106566 A1 | 4/2020 | Yeo et al. | |
| 2020/0106569 A1* | 4/2020 | Tsai | H04W 72/23 |
| 2020/0162208 A1 | 5/2020 | Moon et al. | |

* cited by examiner

METHOD AND APPARATUS FOR TRANSMITTING AND RECEIVING FEEDBACK INFORMATION IN COMMUNICATION SYSTEM

CROSS-REFERENCE TO RELATED APPLICATIONS

This application claims priority to Korean Patent Applications No. 10-2020-0130546 filed on Oct. 8, 2020, No. 10-2020-0171777 filed on Dec. 9, 2020, No. 10-2021-0042179 filed on Mar. 31, 2021, No. 10-2021-0060494 filed on May 11, 2021, No. 10-2021-0100804 filed on Jul. 30, 2021, and No. 10-2021-0122795 filed on Sep. 14, 2021 with the Korean Intellectual Property Office (KIPO), the entire contents of which are hereby incorporated by reference.

BACKGROUND

1. Technical Field

The present disclosure relates to a technique for transmitting and receiving feedback information in a communication system, and more particularly, to a technique for transmitting feedback information of a terminal in response to downlink transmission of a base station.

2. Related Art

With the development of information and communication technology, various wireless communication technologies have been developed. The communication system (hereinafter, a new radio (NR) communication system) using a higher frequency band (e.g., a frequency band of 6 GHz or above) than a frequency band (e.g., a frequency band of 6 GHz or below) of the long term evolution (LTE) (or, LTE-A) is being considered for processing of soaring wireless data. The NR communication system may support not only a frequency band below 6 GHz but also 6 GHz or higher frequency band, and may support various communication services and scenarios as compared to the LTE communication system. For example, usage scenarios of the NR communication system may include enhanced mobile broadband (eMBB), ultra-reliable low-latency communication (URLLC), massive machine type communication (mMTC), and the like. Communication technologies for satisfying the requirements of eMBB, URLLC, and mMTC are required.

In the NR communication system, a base station may transmit common data (e.g., the same data) to a plurality of terminals. The plurality of terminals may receive the common data, and may transmit feedback information for the common data to the base station. In this case, methods for each of the plurality of terminals to independently transmit feedback information for the common data may be required.

Meanwhile, the above-described technologies are described to enhance the understanding of the background of the present disclosure, and they may include non-prior arts that are not already known to those of ordinary skill in the art.

SUMMARY

Accordingly, exemplary embodiments of the present disclosure are directed to providing methods and apparatuses for transmitting and receiving feedback information in a communication system.

According to a first exemplary embodiment of the present disclosure, an operation method of a terminal in a communication system may comprise: receiving, from a base station, a higher layer message including information indicating that first downlink control information (DCI) including a hybrid automatic repeat request (HARQ) feedback enabled/disabled indicator is configured; receiving the first DCI from the base station; receiving first downlink data from the base station based on first scheduling information included in the first DCI; and determining whether to transmit a first HARQ response for the first downlink data based on the HARQ feedback enabled/disabled indicator included in the first DCI.

When the HARQ feedback enabled/disabled indicator indicates enabling of HARQ feedback, the first HARQ response may be transmitted to the base station, and when the HARQ feedback enabled/disabled indicator indicates disabling of HARQ feedback, the first HARQ response may not be transmitted to the base station.

The higher layer message or the first DCI may further include information indicating a HARQ feedback scheme; when the HARQ feedback scheme is acknowledgement (ACK)/negative ACK (NACK) feedback scheme, the first HARQ response transmitted to the base station may include ACK or NACK; and when the HARQ feedback scheme is a NACK-only feedback scheme, the first HARQ response transmitted to the base station may include only NACK.

The operation method may further comprise: receiving second DCI from the base station; receiving second downlink data from the base station based on second scheduling information included in the second DCI; generating multiplexed HARQ responses by multiplexing the first HARQ response and a second HARQ response for the second downlink data; and transmitting the multiplexed HARQ responses to the base station through a same slot, wherein a first feedback resource indicated by the first DCI and a second feedback resource indicated by the second DCI are configured in the same slot.

The multiplexed HARQ responses may be a HARQ codebook, and arrangement of the multiplexed HARQ responses within the HARQ codebook may be determined according to each type of the first downlink data and the second downlink data.

The operation method may further comprise: receiving second DCI from the base station; receiving second downlink data from the base station based on second scheduling information included in the second DCI; and when a first feedback resource indicated by the first DCI and a second feedback resource indicated by the second DCI are configured in a same slot, transmitting a HARQ response for one downlink data having a higher priority among the first downlink data and the second downlink data to the base station through the same slot.

A priority of each of the first downlink data and the second downlink data may vary according to a type of each downlink data, the type of each downlink data may be classified into individual downlink data and common downlink data, the individual downlink data may be downlink data transmitted to one terminal, and the common downlink data may be downlink data transmitted to a plurality of terminals.

The operation method may further comprise: receiving second DCI from the base station; receiving second downlink data from the base station based on second scheduling information included in the second DCI; and transmitting, to the base station, at least one HARQ response among the first HARQ response and a second HARQ response for the second downlink data by using a HARQ feedback resource indicated by one DCI received later in a time domain among the first DCI and the second DCI.

The first downlink data may be individual downlink data transmitted to one terminal or common downlink data transmitted to a plurality of terminals, and priority information of the individual downlink data and priority information of the common downlink data may be included in the higher layer message.

According to a second exemplary embodiment of the present disclosure, an operation method of a terminal in a communication system may comprise: receiving, from a base station, a first higher layer message including information indicating that DCI including a HARQ feedback enabled/disabled indicator is not configured; receiving, from the base station, a second higher layer message including information indicating whether to transmit a HARQ feedback; receiving a first DCI from the base station; receiving downlink data from the base station based on scheduling information included in the first DCI; and determining whether to transmit a HARQ response for the downlink data based on the information included in the second higher layer message.

When the second higher layer message indicates transmission of the HARQ feedback, the HARQ response may be transmitted, and when the second higher layer message does not indicate transmission of the HARQ feedback, whether to transmit the HARQ response may be determined based on a default configuration of the communication system.

The first higher layer message, the second higher layer message, or the first DCI may further include information indicating a HARQ feedback scheme; when the HARQ feedback scheme is an ACK/NACK feedback scheme, the HARQ response transmitted to the base station may include ACK or NACK; and when the HARQ feedback scheme is a NACK-only feedback scheme, the HARQ response transmitted to the base station may include only NACK.

When a HARQ feedback scheme of the HARQ response is not indicated by the base station, the HARQ response may be transmitted based on a default HARQ feedback scheme, and the default HARQ feedback scheme may be an ACK/NACK feedback scheme or a NACK-only feedback scheme.

The first DCI may further include a PUCCH resource indicator (PRI) indicating a HARQ feedback resource, and the HARQ response may be transmitted in the HARQ feedback resource indicated by the PRI.

According to a third exemplary embodiment of the present disclosure, an operation method of a base station in a communication system may comprise: transmitting, to a terminal, a higher layer message including information indicating that first DCI including a HARQ feedback enabled/disabled indicator is configured; transmitting the first DCI including the HARQ feedback enabled/disabled indicator and first scheduling information to the terminal; transmitting first downlink data to the terminal based on the first scheduling information; and determining whether to perform a reception operation of a first HARQ response for the first downlink data based on the HARQ feedback enabled/disabled indicator.

When the HARQ feedback enabled/disabled indicator indicates enabling of HARQ feedback, a reception operation of the first HARQ response may be performed, and when the HARQ feedback enabled/disabled indicator indicates disabling of HARQ feedback, the reception operation of the first HARQ response may not be performed.

The higher layer message or the first DCI may further include information indicating a HARQ feedback scheme; when the HARQ feedback scheme is an ACK/NACK feedback scheme, the HARQ response may include ACK or NACK; and when the HARQ feedback scheme is a NACK-only feedback scheme, the HARQ response may include only NACK.

The operation method may further comprise: transmitting second DCI including second scheduling information to the terminal; transmitting second downlink data to the terminal based on the second scheduling information; and when a first feedback resource indicated by the first DCI and a second feedback resource indicated by the second DCI are configured in a same slot, receiving, from the terminal, the first HARQ response and a second response for the second downlink data in the same slot, wherein the first HARQ response and the second HARQ response are multiplexed in the same slot.

The operation method may further comprise: transmitting second DCI including second scheduling information to the terminal; transmitting second downlink data to the terminal based on the second scheduling information; and when a first feedback resource indicated by the first DCI and a second feedback resource indicated by the second DCI are configured in a same slot, receiving, from the terminal, a HARQ response for one downlink data having a higher priority among the first downlink data and the second downlink data in the same slot.

The first downlink data may be individual downlink data transmitted to one terminal or common downlink data transmitted to a plurality of terminals, and priority information of the individual downlink data and priority information of the common downlink data may be included in the higher layer message.

According to the present disclosure, a base station may transmit a message (e.g., higher layer message, medium access control (MAC) layer message, and/or physical layer message) indicating whether to transmit a hybrid automatic repeat request (HARQ) feedback. A terminal may determine whether to transmit a HARQ feedback based on the message received from the base station. When transmission of a HARQ feedback is indicated, the terminal may transmit a HARQ feedback for downlink data to the base station. The above-described operations may be applied to an exemplary embodiment in which the base station transmits the same downlink data to a plurality of terminals. In this case, the HARQ feedback procedure can be efficiently performed, and the performance of the communication system can be improved.

DETAILED DESCRIPTION OF THE EMBODIMENTS

Figure 1:
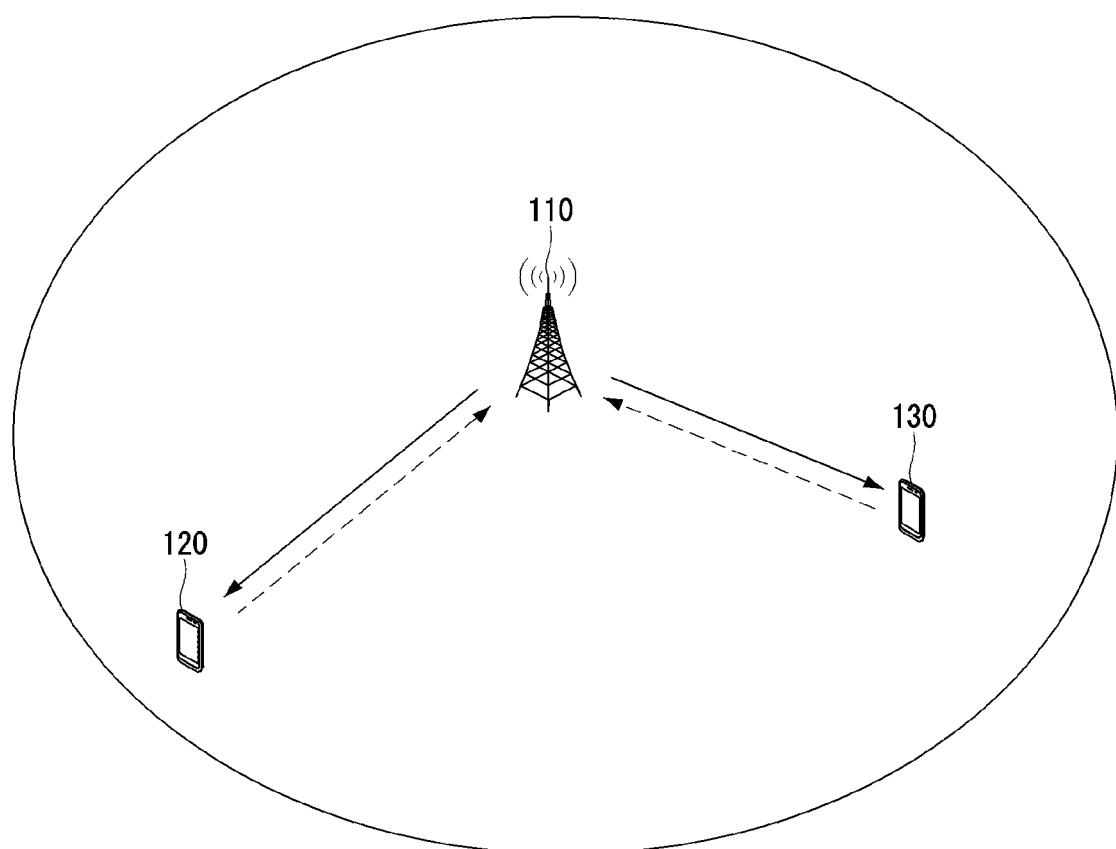
FIG. 1 is a conceptual diagram illustrating a first exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In the embodiments of the present disclosure, "at least one of A and B" may mean "at least one of A or B" or "at least one of combinations of one or more of A and B". Also, in the embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may be used in the same sense as a communication network.

FIG. 1 is a conceptual diagram illustrating a first exemplary embodiment of a communication system.

Referring to FIG. 1, a base station 110 may support cellular communication (e.g., long term evolution (LTE), LTE-advance (LTE-A), LTE-A Pro, LTE-unlicensed (LTE-U), new radio (NR), and NR-unlicensed (NR-U) specified in the $3^{rd}$ generation partnership project (3GPP) specifications), or the like. The base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like. The base station 110 may transmit a downlink channel and/or signal to a first terminal 120. The first terminal 120 may receive the downlink channel and/or signal from the base station 110. The first terminal 120 may transmit an uplink channel and/or signal to the base station 110. The base station 110 may receive the uplink channel and/or signal from the first terminal 120. A second terminal 130 may perform downlink communication and/or uplink communication with the base station 110 in the same or similar manner as the first terminal 120.

The communication node (i.e., base station, terminal, etc.) constituting the communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, evolved Node B, 5G Node B (gNodeB), base transceiver station (BTS), radio base station, radio transceiver, access point, access node, transmission/reception point (Tx/Rx Point), or the like. Among the communication nodes, the terminal may be referred to as a user equipment (UE), access terminal, mobile terminal, station, subscriber station, portable subscriber station, mobile station, node, device, or the like. The communication node may have the following structure.

Figure 2:
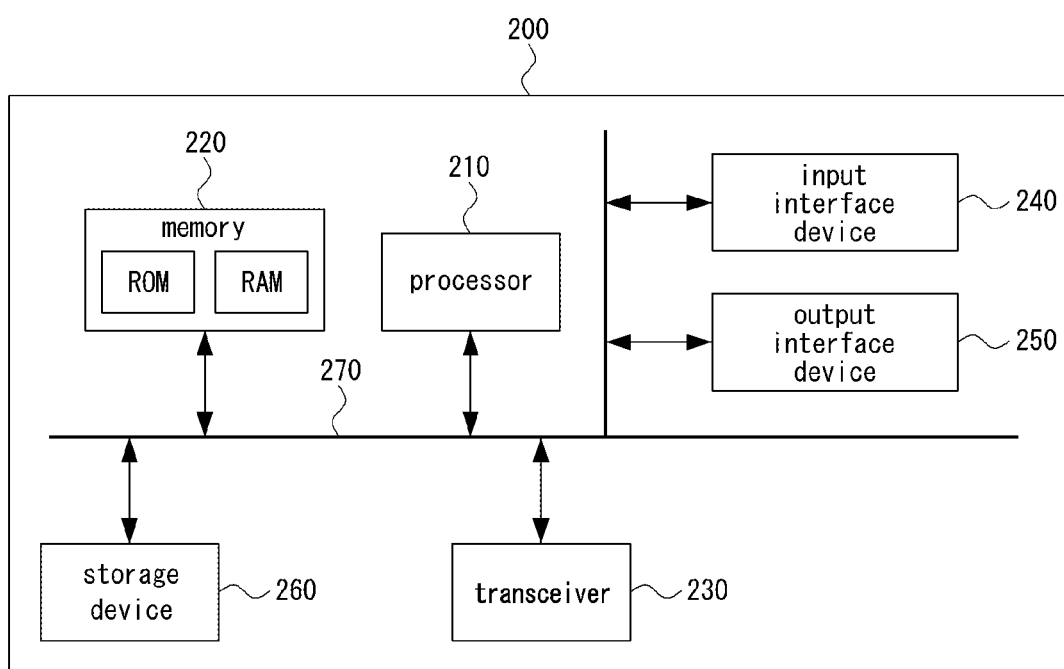
FIG. 2 is a block diagram illustrating a first exemplary embodiment of a communication node constituting a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Hereinafter, operation methods of a communication node in a communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a terminal is described, a corresponding base station may perform an operation corresponding to the operation of the terminal. Conversely, when an operation of the base station is described, the corresponding terminal may perform an operation corresponding to the operation of the base station.

Figure 3:
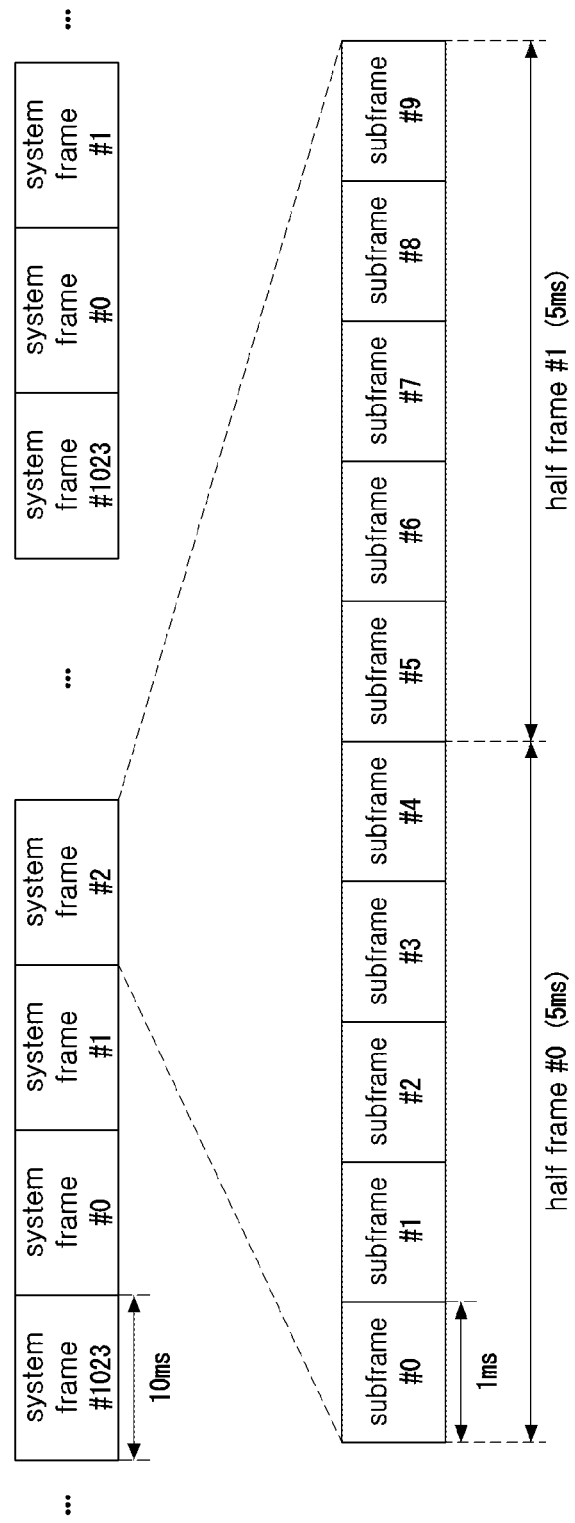
FIG. 3 is a conceptual diagram illustrating a first exemplary embodiment of a system frame in a communication system.

FIG. 3 is a conceptual diagram illustrating a first exemplary embodiment of a system frame in a communication system.

Referring to FIG. 3, time resources in a communication network may be divided into frames. For example, system frames each of which has a length of 10 milliseconds (ms) may be configured consecutively in the time domain of the communication system. System frame numbers (SFNs) may be set to #0 to #1023. In this case, 1024 system frames may be repeated in the time domain of the communication system. For example, an SFN of a system frame after the system frame #1023 may be set to #0.

One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
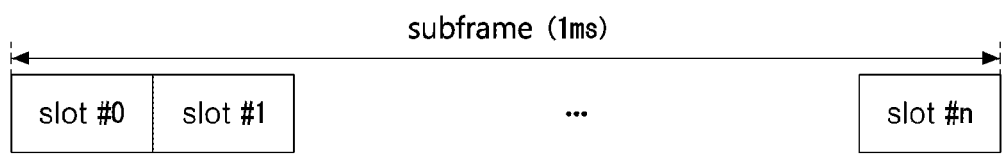
FIG. 4 is a conceptual diagram illustrating a first exemplary embodiment of a subframe in a communication system.

FIG. 4 is a conceptual diagram illustrating a first exemplary embodiment of a subframe in a communication system.

Referring to FIG. 4, one subframe may include n slots, and n may be a natural number. Accordingly, one subframe may be composed of one or more slots.

Figure 5:
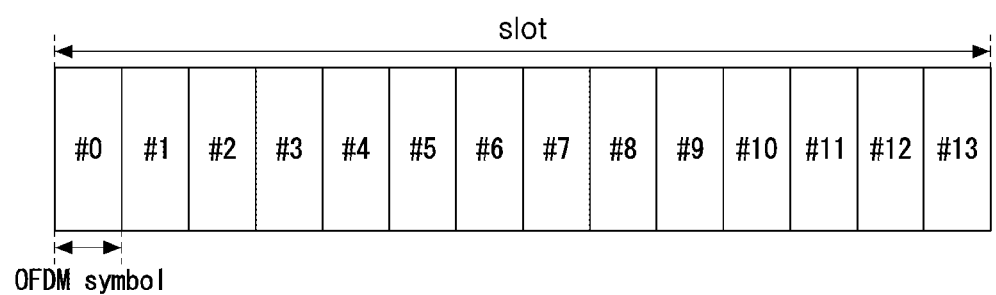
FIG. 5 is a conceptual diagram illustrating a first exemplary embodiment of a slot in a communication system.

FIG. 5 is a conceptual diagram illustrating a first exemplary embodiment of a slot in a communication system.

Referring to FIG. 5, one slot may comprise one or more symbols. One slot shown in FIG. 5 may be composed of 14 symbols. Here, the length of the slot may vary depending on the number of symbols included in the slot and the length of the symbol. Alternatively, the length of the slot may vary according to a numerology. When a subcarrier spacing is 15 kHz (e.g., $\mu=0$), the length of the slot may be 1 ms. In this case, one system frame may include 10 slots. When the subcarrier spacing is 30 kHz (e.g., $\mu=1$), the length of the slot may be 0.5 ms. In this case, one system frame may include 20 slots.

When the subcarrier spacing is 60 kHz (e.g., $\mu=2$), the length of the slot may be 0.25 ms. In this case, one system frame may include 40 slots. When the subcarrier spacing is 120 kHz (e.g., $\mu=3$), the length of the slot may be 0.125 ms. In this case, one system frame may include 80 slots. When the subcarrier spacing is 240 kHz (e.g., $\mu=4$), the length of the slot may be 0.0625 ms. In this case, one system frame may include 160 slots.

The symbol may be configured as a downlink (DL) symbol, a flexible symbol, or an uplink (UL) symbol. A slot composed only of DL symbols may be referred to as 'DL slot', a slot composed only of FL symbols may be referred to as 'FL slot', and a slot composed only of UL symbols may be referred to as 'UL slot'.

A reference signal may be a channel state information-reference signal (CSI-RS), a sounding reference signal (SRS), a demodulation-reference signal (DM-RS), a phase tracking-reference signal (PT-RS), or the like. A channel may be a physical downlink control channel (PDCCH), a physical downlink shared channel (PDSCH), a physical uplink control channel (PUCCH), a physical uplink shared channel (PUSCH), a physical sidelink control channel (PSCCH), a physical sidelink shared channel (PSSCH), or the like. In exemplary embodiments below, a control channel may refer to a PDCCH, PUCCH, or PSCCH, and a data channel may refer to a PDSCH, PUSCH, or PSSCH.

Figure 6:
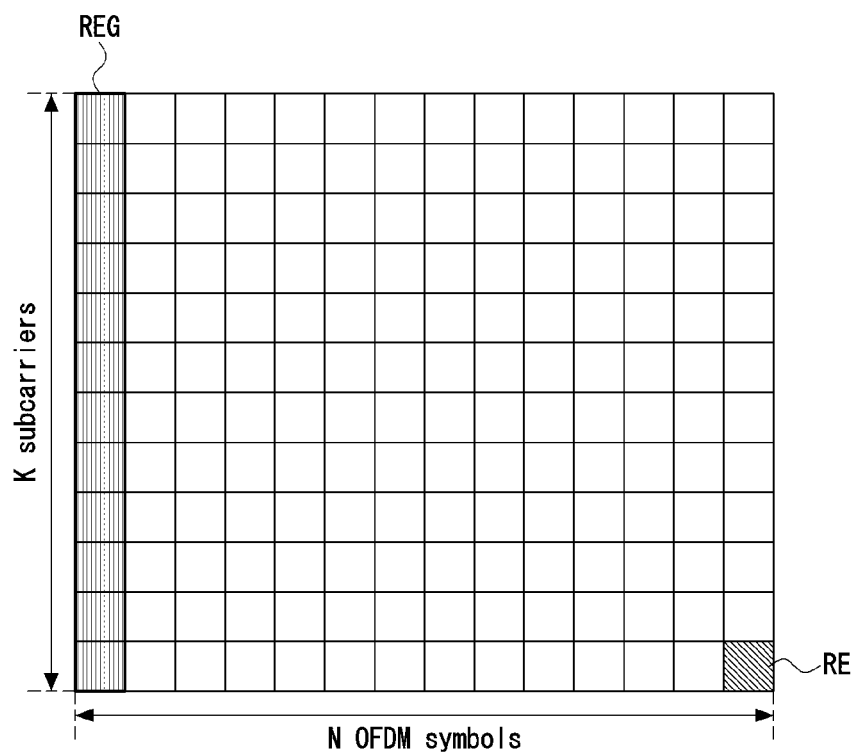
FIG. 6 is a conceptual diagram illustrating a first exemplary embodiment of time-frequency resources in a communication system.

FIG. 6 is a conceptual diagram illustrating a first exemplary embodiment of time-frequency resources in a communication system.

Referring to FIG. 6, a resource configured with one OFDM symbol in the time domain and one subcarrier in the frequency domain may be defined as a 'resource element (RE)'. Resources configured with one OFDM symbol in the time domain and K subcarriers in the frequency domain may be defined as a 'resource element group (REG)'. One REG may include K REs. The REG may be used as a basic unit of resource allocation in the frequency domain. K may be a natural number. For example, K may be 12. N may be a natural number. N in the slot shown in FIG. 5 may be 14, and N in the slot shown in FIG. 6 may be 7. The N OFDM symbols may be used as a basic unit of resource allocation in the time domain.

Downlink data may be transmitted on a physical downlink shared channel (PDSCH). The base station may transmit configuration information of the PDSCH to the terminal on a physical downlink control channel (PDCCH). The terminal may obtain the configuration information (e.g., scheduling information) of the PDSCH by receiving the PDCCH (e.g., downlink control information (DCI)). For example, the configuration information of the PDSCH may include a modulation and coding scheme (MCS) used for transmission and reception of the PDSCH, time resource information of the PDSCH, frequency resource information of the PDSCH, feedback resource information of the PDSCH, and/or the like. The PDSCH may refer to a radio resource through which the downlink data is transmitted and received. Alternatively, the PDSCH may refer to the downlink data itself. The PDCCH may refer to a radio resource through which the downlink control information (e.g., DCI) is transmitted and received. Alternatively, the PDCCH may refer to the downlink control information itself.

Figure 7:
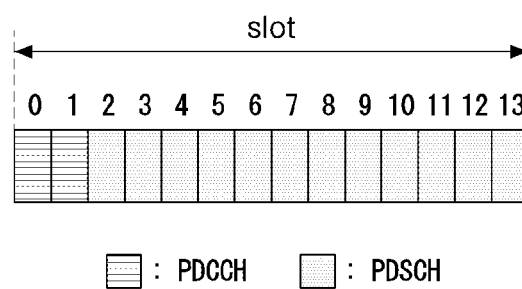
FIG. 7 is a conceptual diagram illustrating a second exemplary embodiment of a slot in a communication system.

FIG. 7 is a conceptual diagram illustrating a second exemplary embodiment of a slot in a communication system.

Referring to FIG. 7, one slot may include 14 symbols in the time domain. Here, the symbol may be an OFDM symbol. Among the 14 symbols, some symbol(s) may be configured as a PDCCH (e.g., PDCCH resource), and the remaining symbols may be configured as a PDSCH (e.g., PDSCH resource). The PDCCH may be mapped from the starting symbol (e.g., symbol #0) of the slot. For example, the PDCCH may be mapped to the symbols #0 and #1. The PDSCH may be mapped from the symbol (e.g., symbol #2) after the ending symbol (e.g., symbol #1) of the PDCCH. For example, the PDSCH may be mapped to the symbols #2 to #13. The above-described mapping scheme may be referred to as 'PDSCH mapping type A'. That is, when the PDSCH mapping type A is used, the PDCCH may be mapped from the starting symbol of the slot, and the PDSCH may be mapped from the symbol after the ending symbol of the PDCCH. In this case, the length of the PDSCH in the time domain may be 4, 5, 6, 7, 8, 9, 10, 11, 12, or 13 symbols.

The base station may configure a bandwidth part (BWP) for downlink communication. The BWP may be configured differently for each terminal. The base station may inform the terminal of configuration information of the BWP by using higher layer signaling. The higher layer signaling may refer to a transmission operation of system information and/or a transmission operation of a radio resource control (RRC) message. The number of BWPs configured for one terminal may be equal to or greater than 1. The terminal may receive the configuration information of the BWP from the base station, and may identify the BWP(s) configured by the base station based on the configuration information of the BWP. When a plurality of BWPs are configured for downlink communication, the base station may activate one or more BWPs among the plurality of BWPs. The base station may transmit configuration information of the activated BWP(s) to the terminal by using one or more among higher layer signaling, a medium access control (MAC) control element (CE), and DCI. The base station may perform downlink communication by using the activated BWP(s). The terminal may identify the activated BWP(s) by receiving the configuration information of the activated BWP(s) from the base station, and may perform a downlink reception operation in the activated BWP(s).

Figure 8:
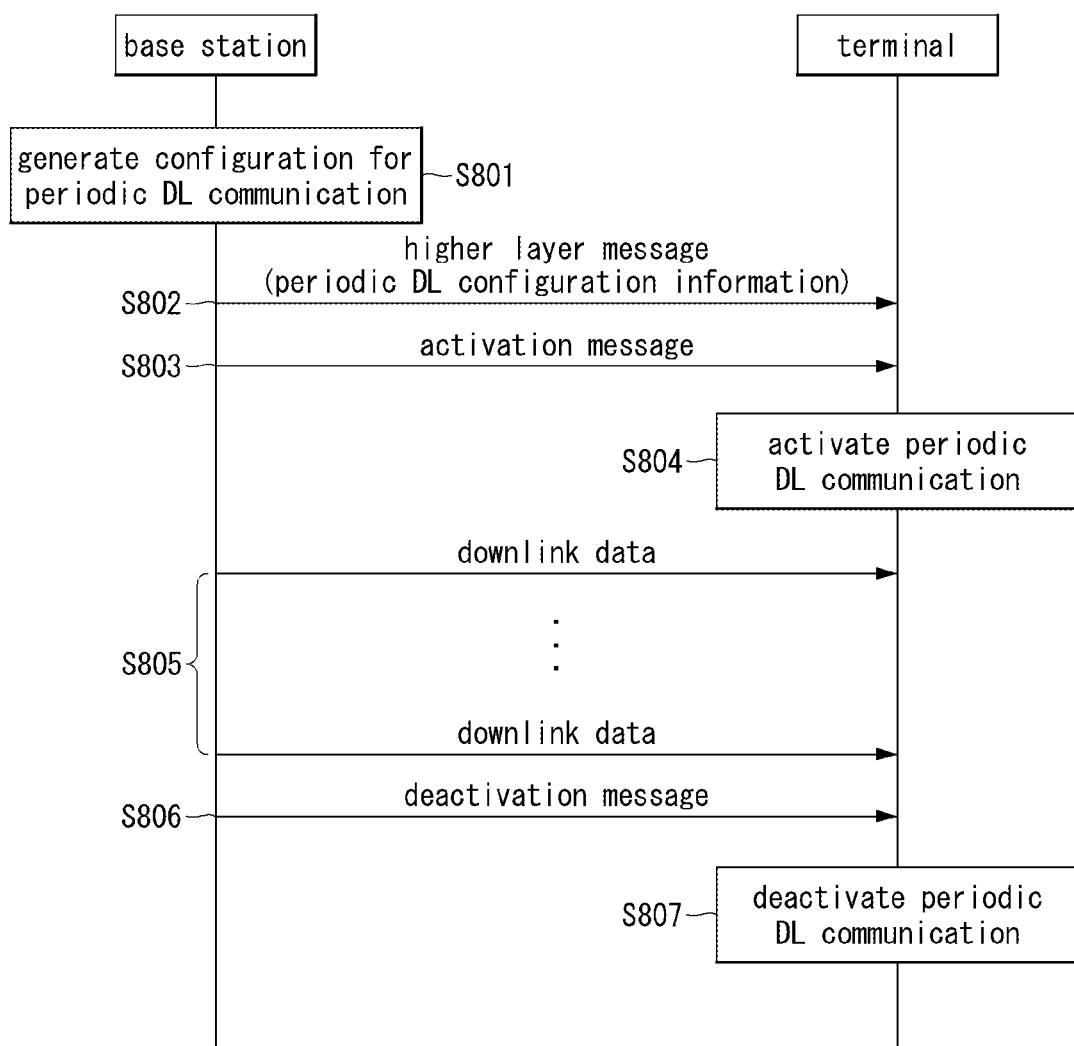
FIG. 8 is a sequence chart illustrating a first exemplary embodiment of a downlink communication method in a communication system.

FIG. 8 is a sequence chart illustrating a first exemplary embodiment of a downlink communication method in a communication system.

Referring to FIG. 8, a communication system may include a base station and a terminal. The base station may be the base station 110 shown in FIG. 1, and the terminal may be the first terminal 120 or the second terminal 130 shown in FIG. 1. Each of the base station and the terminal may be configured identically or similarly to the communication node 200 shown in FIG. 2.

The base station may generate configuration information (hereinafter, referred to as 'periodic downlink (DL) configuration information') for periodic DL communication (S801). The periodic DL communication may be performed based on a semi-persistent scheduling (SPS) scheme, configured scheduling (CS) scheme, or configured grant (CG) scheme. The periodic DL communication shown in FIG. 8 may be 'periodic DL communication between one base station and one terminal' or 'periodic DL communication between one base station and a plurality of terminals'. Hereinafter, operations of a terminal may be interpreted as 'operations of a plurality of terminals'. The periodic DL configuration information may include one or more information elements (IEs) among IEs shown in Table 1 below.

TABLE 1

| IE | Description |
| --- | --- |
| Time periodicity | Time periodicity of DL transmission |
| Number of HARQ processes | Number of hybrid automatic repeat request (HARQ) processes used for periodic DL communication |
| HPN offset | HARQ process number (HPN) offset used for calculation of a HPN (e.g., HARQ index) in periodic DL communication |
| Feedback resource indicator | Feedback resource indicator indicating a HARQ-acknowledgement (HARQ-ACK) feedback resource in periodic DL communication |

The base station may transmit a higher layer message (e.g., system information and/or RRC message) including the periodic DL configuration information to the terminal (S802). In the step S802, the base station may transmit the higher layer message to a plurality of terminals. Here, the higher layer message may be a cell-common RRC message (e.g., cell-specific RRC message), BWP-common RRC message, and/or UE group-common RRC message. Configuration information included in the UE group-common RRC message may be information commonly applied to terminals belonging to a specific terminal group (or a specific terminal set). The terminal may receive the higher layer message (e.g., system information and/or RRC message) from the base station, identify the periodic DL configuration information (e.g., IEs defined in Table 1) included in the higher layer message, and configure periodic DL communication based on the periodic DL configuration information.

The periodic DL communication may be activated (e.g., triggered) by an activation message (e.g., DCI). The base station may generate an activation message for activating the periodic DL communication, and may transmit the activation message to the terminal (S803). The activation message may be DCI (e.g., activation DCI). A combination of one or more fields included in the DCI may indicate activation of the periodic DL communication. In addition, when a plurality of periodic DL communications are configured by the base station, a combination of one or more fields included in the DCI may indicate one periodic DL communication to be activated among the plurality of periodic DL communications.

The DCI may be transmitted on a PDCCH, and a cyclic redundancy check (CRC) of the DCI may be scrambled by a radio network temporary identifier (RNTI) for the periodic DL communication. The base station may transmit the DCI by using a common RNTI to transmit the activation message to a plurality of terminals. For example, the base station may transmit the DCI by using a group-configured scheduling-RNTI (G-CS-RNTI) to activate periodic DL communication for one or more terminals. When periodic DL communication for one or more terminals is activated, the same downlink data may be transmitted to the one or more terminals. The DCI scrambled by the G-CS-RNTI may be common DCI. The G-CS-RNTI may be configured by the base station, and the base station may transmit configuration information of the G-CS-RNTI to the terminal. The configuration information of the G-CS-RNTI may be transmitted to the terminal through a separate procedure before the S802 or S801.

The terminal may perform a reception operation of the activation message (e.g., DCI). For example, the terminal may receive the DCI by using the G-CS-RNTI, and may identify that periodic DL communication configured by the base station is activated based on a combination of one or more fields included in the DCI. In this case, the terminal may activate the periodic DL communication (S804). Here, the terminal may periodically receive the common DCI. In addition, the terminal receiving the activation message (e.g., common DCI) may be a terminal capable of receiving a common PDSCH (e.g., common data). The common PDSCH may be downlink data transmitted periodically. In addition, the common PDSCH may be the same downlink data transmitted to the plurality of terminals.

When decoding of the activation message is successful, the terminal may transmit acknowledgment (ACK) for the activation message to the base station. When decoding of the activation message fails, the terminal may transmit negative ACK (NACK) for the activation message to the base station. After transmitting the activation message, the base station may perform a reception operation of HARQ-ACK for the activation message. In exemplary embodiments, the HARQ-ACK, HARQ response, HARQ feedback, and feedback information may be used with the same meaning. If ACK for the activation message is not received, the base station may retransmit the activation message. The case where ACK for the activation message is not received may be a case where NACK for the activation message is received and/or a case where HARQ-ACK for the activation message is not received within a preset period. That is, the base station may consider the case where HARQ-ACK for the activation message is not received within a preset period as the case where NACK for the activation message is received. The activation message may be retransmitted on a common PDCCH or a UE-specific PDCCH. For example, the activation message may be retransmitted to all terminals participating in the periodic DL communication or terminal(s) that transmitted NACK for the activation message. Alternatively, in the step of retransmitting the activation message, the base station may transmit a MAC message (e.g., MAC CE) including information indicating activation of the periodic DL communication to the terminal(s).

When the activation message is not successfully received, the terminal may perform the operation of receiving the activation message again. For example, the terminal may receive the retransmitted activation message by performing a monitoring operation on a common PDCCH and/or a UE-specific PDCCH. As another method, the terminal may receive the MAC message (e.g., MAC CE) including information indicating activation of the periodic DL communication from the base station.

The activation message transmitted in the step S803 may include scheduling information (e.g., scheduling information for periodic DL communication). For example, the base station may transmit the higher layer message including a part of scheduling information (e.g., IEs defined in Table 1) for the periodic DL communication in the step S802, and transmit the activation message including the remaining scheduling information (e.g., time domain resource assignment (TDRA), frequency domain resource assignment (FDRA), MCS, etc.) for the periodic DL communication in the step S803. The terminal may identify the part of scheduling information for the periodic DL communication by receiving the higher layer message from the base station, and may identify the remaining scheduling information for the periodic DL communication by receiving the activation message from the base station.

After transmitting the activation message, the base station may periodically transmit downlink data (S805). The downlink data may be transmitted through the time resource indicated by the activation message according to the periodicity indicated by the higher layer message. The downlink data may be common downlink data (e.g., common PDSCH) for a plurality of terminals. When periodic DL communication is activated (e.g., when the activation message is received), the terminal may perform a downlink data reception operation in the step S805. The terminal may transmit a HARQ-ACK to the base station based on a reception result (e.g., decoding result) of the downlink data. The HARQ-ACK transmission operation may be performed according to at least one of an exemplary embodiment shown in FIG. 9, an exemplary embodiment shown in FIG. 10, an exemplary embodiment shown in FIG. 11, or an exemplary embodiment shown in FIG. 12.

The base station may generate a deactivation message to deactivate the periodic DL communication. The base station may transmit the deactivation message (S806). The deactivation message may be DCI (e.g., deactivation DCI), and a CRC of the DCI may be scrambled by a common RNTI (e.g., G-CS-RNTI). The DCI scrambled by the common RNTI may be common DCI. The DCI indicating deactivation of the periodic DL communication may be transmitted to one or more terminals by using a common RNTI. A combination of one or more fields included in the DCI may indicate deactivation of the periodic DL communication. In addition, when a plurality of periodic DL communications are configured, a combination of one or more fields included in the DCI may indicate one periodic DL communication to be deactivated among the plurality of periodic DL communications.

The terminal may perform a reception operation of the deactivation message (e.g., DCI). For example, the terminal may receive the DCI by using the G-CS-RNTI, and may identify that the periodic DL communication configured by the base station is deactivated based on a combination of one or more fields included in the DCI. In this case, the terminal may deactivate the periodic DL communication (S807). Here, the terminal may periodically receive the common DCI. In addition, the terminal receiving the deactivation message (e.g., common DCI) may be a terminal capable of receiving a common PDSCH (e.g., common data). The common PDSCH may be downlink data transmitted periodically. In addition, the common PDSCH may be the same downlink data transmitted to a plurality of terminals.

After transmission of the deactivation message, the base station may stop the periodic DL communication deactivated by the deactivation message. In addition, the terminal may stop the periodic DL communication deactivated by the deactivation message received from the base station.

Figure 9:
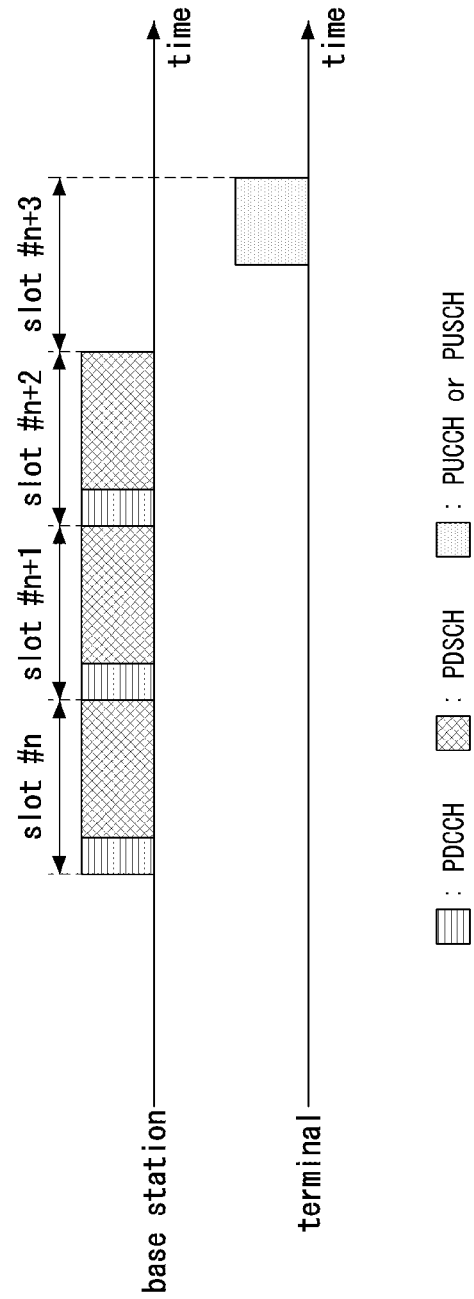
FIG. 9 is a conceptual diagram illustrating a first exemplary embodiment of a method for transmitting feedback information in a communication system.

FIG. 9 is a conceptual diagram illustrating a first exemplary embodiment of a method for transmitting feedback information in a communication system.

Referring to FIG. 9, the base station may transmit a control channel (e.g., PDCCH) and a data channel (e.g., PDSCH) scheduled by the PDCCH (e.g., DCI) to the terminal in a slot #n. The terminal may obtain the DCI by performing a PDCCH monitoring operation. The DCI may include information (e.g., scheduling information) required for reception of the PDSCH. The terminal may obtain time and frequency resource information, MCS information, etc. for the PDSCH (e.g., PDSCH of the slot #n) by receiving the PDCCH in the slot #n. In exemplary embodiments below, the PDCCH (e.g., DCI) of the slot #n may mean the PDCCH (e.g., DCI) transmitted or received in the slot #n, and the PDSCH of the slot #n may mean the PDSCH transmitted or received in the slot #n. n may be an integer greater than or equal to 0.

In addition, by receiving the DCI in the slot #n, the terminal may obtain configuration information for transmission of a HARQ response for the PDSCH scheduled by the DCI. The configuration information for transmission of a HARQ response may include information on a time and/or frequency resource used for transmission of the HARQ response. For example, the terminal may determine that the HARQ response for the PDSCH (e.g., the PDSCH of the slot #n) scheduled by the DCI of the slot #n is transmitted on a PUCCH or PUSCH of the slot #n+3.

The DCI may include information (e.g., time offset) indicating a time interval from the reception time of the DCI (or PDSCH scheduled by the DCI) to the transmission time of the HARQ response. For example, the time interval between the reception time of the DCI (or PDSCH) and the transmission time of the HARQ response may be expressed in units of symbols, slots, or subframes. The time interval between the reception time of the DCI (or PDSCH) and the transmission time of the HARQ response may be indicated by the a PDSCH-to-HARQ feedback timing indicator field included in the DCI. Accordingly, the terminal may identify the transmission time of the HARQ response for the PDSCH based on the PDSCH-to-HARQ feedback timing indicator field included in the DCI.

The base station may transmit DCIs and PDSCHs to the terminal in the slots #n to #n+2, respectively. The HARQ responses for the PDSCHs transmitted in the slots #n to #n+2 may be configured to be transmitted on a PUCCH or PUSCH of the slot #n+3. In this case, the PDSCH-to-HARQ feedback timing indicator field included in the DCI of the slot #n may be set to 3. The PDSCH-to-HARQ feedback timing indicator field included in the DCI of the slot #n+1 may be set to 2. The PDSCH-to-HARQ feedback timing indicator field included in the DCI of the slot #n+2 may be set to 1. The terminal may transmit a HARQ response for a corresponding PDSCH in a slot after slot(s) corresponding to the value indicated by the PDSCH-to-HARQ feedback timing indicator field included in the DCI (e.g., scheduling DCI) from the slot in which the PDSCH is received (or from the slot in which the DCI is received). In exemplary embodiments below, 'scheduling DCI' may refer to DCI used to schedule PDSCH transmission or PUSCH transmission.

The base station may indicate (or configure) a resource in which the terminal receiving the downlink data is to transmit a feedback (e.g., HARQ response). For example, the base station may indicate (or configure) to the terminal a resource in which a HARQ response (e.g., ACK or NACK) for the downlink data is to be transmitted. The resource in which the HARQ response is to be transmitted may be referred to as a 'feedback resource'. Configuration information of the feedback resource may include one or more IEs defined in Table 2 below.

TABLE 2

| IE | Description |
| --- | --- |
| Time resource information | A starting symbol index, the number of symbols (e.g., the length of the symbols), and/or an ending symbol index of a feedback resource |
| Frequency resource information | A starting resource block (RB) index, the number of RBs (e.g., the length of the RBs), and/or an ending RB index of a feedback resource |
| Frequency hopping information | Information on a frequency hopping of a feedback resource |
| Sequence information | Sequence used for transmission of a HARQ response |

The base station may transmit the configuration information of the feedback resource to the terminal. The terminal may receive the configuration information of the feedback resource from the base station, identify the feedback resource based on the configuration information, and transmit a feedback (e.g., HARQ response) for the downlink data to the base station by using the feedback resource.

For example, the base station may transmit the configuration information of the feedback resource by using at least one of a higher layer message (e.g., common RRC message, dedicated RRC message, cell-specific RRC message, UE-specific RRC message), MAC CE, or DCI (e.g., DCI 1_x, common DCI, DCI 2_x). Here, x may be an integer greater than or equal to 0.

Alternatively, the feedback resource may be indicated by a combination of an RRC message and DCI. For example, the base station may transmit an RRC message including configuration information of a feedback resource table, and the terminal may identify the feedback resource table indicated by the RRC message. In the feedback resource table, each index may indicate time resource information, frequency resource information, frequency hopping information, and/or sequence information of a feedback resource. The base station may transmit DCI including one index within the feedback resource table. The terminal may identify the index included in the DCI received from the base station, and identify the time resource information, frequency resource information, frequency hopping information, and/or sequence information indicated by the index within the feedback resource table, and determine a feedback resource based on the identified information.

Meanwhile, the base station may perform DL communication with one or more terminals. In this case, the base station may schedule the same PDSCH (e.g., common PDSCH) for the one or more terminals. For example, the base station may schedule the same PDSCH for the one or more terminals by using a UE-specific PDCCH (e.g., terminal-specific DCI). The UE-specific PDCCH may be a PDCCH transmitted through a UE-specific search space (or UE-specific search space set). The UE-specific PDCCH may be scrambled by a UE-specific RNTI. The UE-specific PDCCH may mean DCI including IE(s) applied to a specific terminal. The base station may perform scheduling for the same PDSCH by using different RNTIs for different terminals or terminals having different RNTIs. The different RNTIs may be used for scrambling the DCI scheduling the same PDSCH.

The terminal may receive the UE-specific PDCCH by performing a monitoring operation on the UE-specific search space (or UE-specific search space set). The UE-specific PDCCH may be received by using a UE-specific RNTI. The terminal may receive the PDSCH (e.g., common PDSCH) based on the IE(s) included in the UE-specific PDCCH.

Alternatively, the base station may schedule the same PDSCH for one or more terminals by using a group common PDCCH. The group common PDCCH may be transmitted through a common search space (or, common search space set). The group common PDCCH may be scrambled by using a common RNTI, and the common RNTI may be used by a plurality of terminals. The group common PDCCH may be DCI including IE(s) commonly applied to a plurality of terminals. The base station may schedule the PDSCH for different terminals by using the same RNTI (e.g., common RNTI).

The terminal may receive the group common PDCCH by performing a monitoring operation on the common search space (or, common search space set). The group common PDCCH may be received by using the common RNTI. The terminal may receive the PDSCH (e.g., common PDSCH) based on the IE(s) included in the group common PDCCH.

When scheduling the same PDSCH for one or more terminals, the base station may indicate (or configure) a scheduling scheme to the terminal by using a higher layer message (e.g., RRC message). Information indicating the scheduling scheme may be included in RRC configuration information. For example, the RRC configuration information may indicate that the same PDSCH is scheduled to one or more terminals through a group common PDCCH. The terminal may identify the scheduling scheme by receiving the higher layer message (e.g., RRC configuration information) from the base station. For example, the terminal may identify that the same PDSCH is scheduled to one or more terminals through a group common PDCCH.

The base station may configure an RNTI (hereinafter, referred to as 'MB-RNTI') for scheduling the same PDSCH to one or more terminals. The base station may transmit configuration information of the MB-RNTI to one or more terminals, and the one or more terminals may identify the MB-RNTI configured by the base station. That is, the MB-RNTI may be configured to one or more terminals. The base station may schedule the same PDSCH for one or more terminals by using the MB-RNTI. That is, DCI including scheduling information for the same PDSCH may be scrambled by the MB-RNTI. The terminal may receive the DCI from the base station by using the MB-RNTI, and may receive the same PDSCH based on the scheduling information included in the DCI.

When PDSCH transmission (e.g., the same PDSCH transmission) is scheduled by DCI having the MB-RNTI, a feedback procedure of a HARQ response for the PDSCH may be performed by using a feedback resource of each terminal. In this case, a higher layer message (e.g., RRC configuration information) including configuration information of the feedback resource may be transmitted from the base station to the terminal.

Alternatively, when PDSCH transmission (e.g., the same PDSCH transmission) is scheduled by DCI having the MB-RNTI, a feedback procedure of a HARQ response for the PDSCH may be performed by using a common feedback resource associated with the MB-RNTI. In this case, a higher layer message (e.g., RRC configuration information) including configuration information of the common feedback resource may be transmitted from the base station to the terminal.

When the base station schedules the same PDSCH to one or more terminals, the feedback procedure of the HARQ response for the PDSCH may be performed as follows.

The base station may schedule the same PDSCH to one or more terminals. In order to schedule the same PDSCH to one or more terminals, the base station may use a group common PDCCH or a UE-specific PDCCH. The terminal(s) may obtain scheduling information by receiving the group common PDCCH or UE-specific PDCCH from the base station, and may receive the same PDSCH based on the scheduling information.

When the same PDSCH is scheduled for one or more terminals, the base station may instruct the terminal(s) to perform HARQ response feedback for the corresponding PDSCH.

When the same PDSCH is scheduled for one or more terminals, the base station may instruct the terminal not to transmit a HARQ response when a reception result (e.g., decoding result) of the PDSCH is ACK. When the same PDSCH is scheduled for one or more terminals, the base station may instruct the terminal to transmit a HARQ response only when a reception result (e.g., decoding result) of the PDSCH is NACK. That is, the base station may inform the terminal that the 'NACK-only feedback scheme' is used. The information indicating that the NACK-only feedback scheme is used may be transmitted from the base station to the terminal through a higher layer message (e.g., RRC configuration information and/or PUCCH configuration information).

The terminal may identify that the NACK-only feedback scheme is used based on the information included in the higher layer message (e.g., RRC configuration information and/or PUCCH configuration information) received from the base station. Therefore, the terminal may not transmit a HARQ feedback (e.g., HARQ-ACK, HARQ response) when the reception result of the PDSCH is ACK, and may transmit a HARQ feedback when the reception result of the PDSCH is NACK.

On the other hand, when an 'ACK/NACK feedback scheme' is used, the terminal may transmit ACK for the PDSCH when the PDSCH is successfully received, and may transmit NACK for the PDSCH when the reception of the PDSCH fails.

The base station may transmit a higher layer message (e.g., RRC configuration information) indicating whether DCI (e.g., scheduling DCI) indicating enable or disable of HARQ feedback for DL transmission is configured. The terminal may receive the higher layer message from the base station, and identify whether DCI including the information indicating enable or disable of HARQ feedback (hereinafter, referred to as 'HARQ feedback enabled/disabled indicator') is configured. That the DCI including the HARQ feedback enabled/disabled indicator is configured may mean that transmission of the DCI including the HARQ feedback enabled/disabled indicator is enabled. That the DCI including the HARQ feedback enabled/disabled indicator is not configured may mean that transmission of the DCI including the HARQ feedback enabled/disabled indicator is disabled.

If the DCI including the HARQ feedback enabled/disabled indicator is not configured, the DCI including the HARQ feedback enabled/disabled indicator may not be transmitted. In this case, enabling or disabling of the HARQ feedback for DL transmission may be indicated by a higher layer message (e.g., RRC configuration information).

The DCI including the HARQ feedback enabled/disabled indicator may be configured by the base station. In this case, the base station may transmit the DCI including the HARQ feedback enabled/disabled indicator to the terminal. The DCI may include scheduling information of a PDSCH associated with the HARQ feedback enabled/disabled indicator. When the HARQ feedback enabled/disabled indicator indicates enabling of HARQ feedback, a HARQ feedback may be transmitted. When the HARQ feedback enabled/disabled indicator indicates disabling of HARQ feedback, a HARQ feedback may not be transmitted. The DCI including the HARQ feedback enabled/disabled indicator may be a group common DCI.

When the HARQ feedback enabled/disabled indicator indicates enabling of HARQ feedback, the terminal may transmit a HARQ feedback after a preset period from a reception time of the DCI including the HARQ feedback enabled/disabled indicator. The preset period may be X slots. X may be an integer greater than or equal to 0. Information on the preset period may be included in the DCI together with the HARQ feedback enabled/disabled indicator. When the HARQ feedback enabled/disabled indicator indicates disabling of the HARQ feedback, the terminal may not perform a HARQ feedback transmission operation after the preset period from the reception time of the DCI including the HARQ feedback enabled/disabled indicator. The preset period may be X slots. X may be an integer greater than or equal to 0.

The DCI including the HARQ feedback enabled/disabled indicator may not be configured by a higher layer message (e.g., RRC configuration information). The terminal may identify that the DCI including the HARQ feedback enabled/disabled indicator is not configured by receiving the higher layer message. That is, the terminal may determine that DCI does not include the HARQ feedback enabled/disabled indicator. In this case, the terminal may not transmit a HARQ feedback for downlink data. Here, downlink data for which a HARQ feedback is not transmitted may be limited to common downlink data (e.g., the same PDSCH) for one or more terminals.

When the higher layer message indicating whether DCI including the HARQ feedback enabled/disabled indicator is configured (e.g., RRC configuration information) is not received from the base station or when DCI including the HARQ feedback enabled/disabled indicator is not configured, the terminal may determine that whether to transmit a HARQ feedback is indicated by a higher layer message (e.g., RRC configuration information). The terminal may receive a higher layer message (e.g., RRC configuration information) indicating whether to transmit a HARQ feedback from the base station, and may determine whether to transmit a HARQ feedback based on the received higher layer message.

Figure 10:
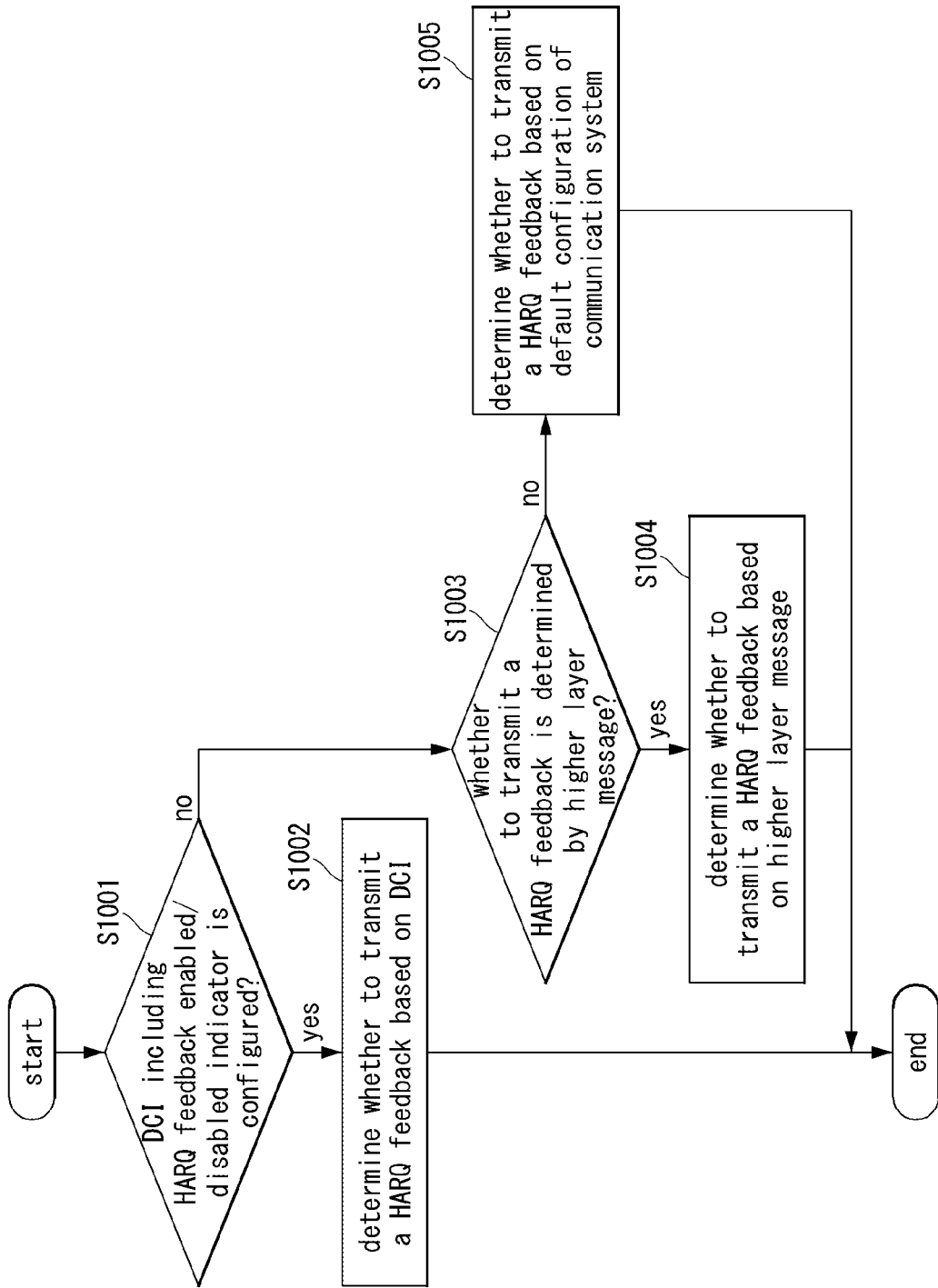
FIG. 10 is a sequence chart illustrating a first exemplary embodiment of a method for indicating enable/disable of HARQ feedback in a communication system.

FIG. 10 is a sequence chart illustrating a first exemplary embodiment of a method for indicating enable/disable of HARQ feedback in a communication system.

Referring to FIG. 10, a communication system may include a base station and a terminal. The base station may be the base station 110 shown in FIG. 1, and the terminal may be the first terminal 120 or the second terminal 130 shown in FIG. 1. Each of the base station and the terminal may be configured identically or similarly to the communication node 200 shown in FIG. 2.

The terminal may receive a higher layer message (e.g., RRC configuration information) from the base station, and identify whether DCI including the HARQ feedback enabled/disabled indicator is configured based on information included in the higher layer message (S1001). When the DCI including the HARQ feedback enabled/disabled indicator is configured, the terminal may determine whether to transmit a HARQ feedback based on the HARQ feedback enabled/disabled indicator included in the DCI (S1002).

When the DCI including the HARQ feedback enabled/disabled indicator is not configured, the terminal may determine that whether to transmit a HARQ feedback is indicated by a higher layer message. The terminal may determine whether a higher layer message (e.g., RRC configuration information) received from the base station includes information indicating whether to transmit a HARQ feedback (S1003). The higher layer message in the step S1003 may be the same as the higher layer message in the step S1001. Alternatively, the higher layer message in the step S1003 may be different from the higher layer message in the step S1001. When the higher layer message indicates whether to transmit a HARQ feedback, the terminal may determine whether to transmit a HARQ feedback based on information included in the higher layer message (S1004). When the higher layer message does not indicate whether to transmit a HARQ feedback, the terminal may determine whether to transmit a HARQ feedback based on a default configuration of the communication system (S1005). When whether to transmit a HARQ feedback is not indicated by the higher layer message, the default configuration of the communication system may be transmitting a HARQ feedback or not transmitting a HARQ feedback.

Figure 11:
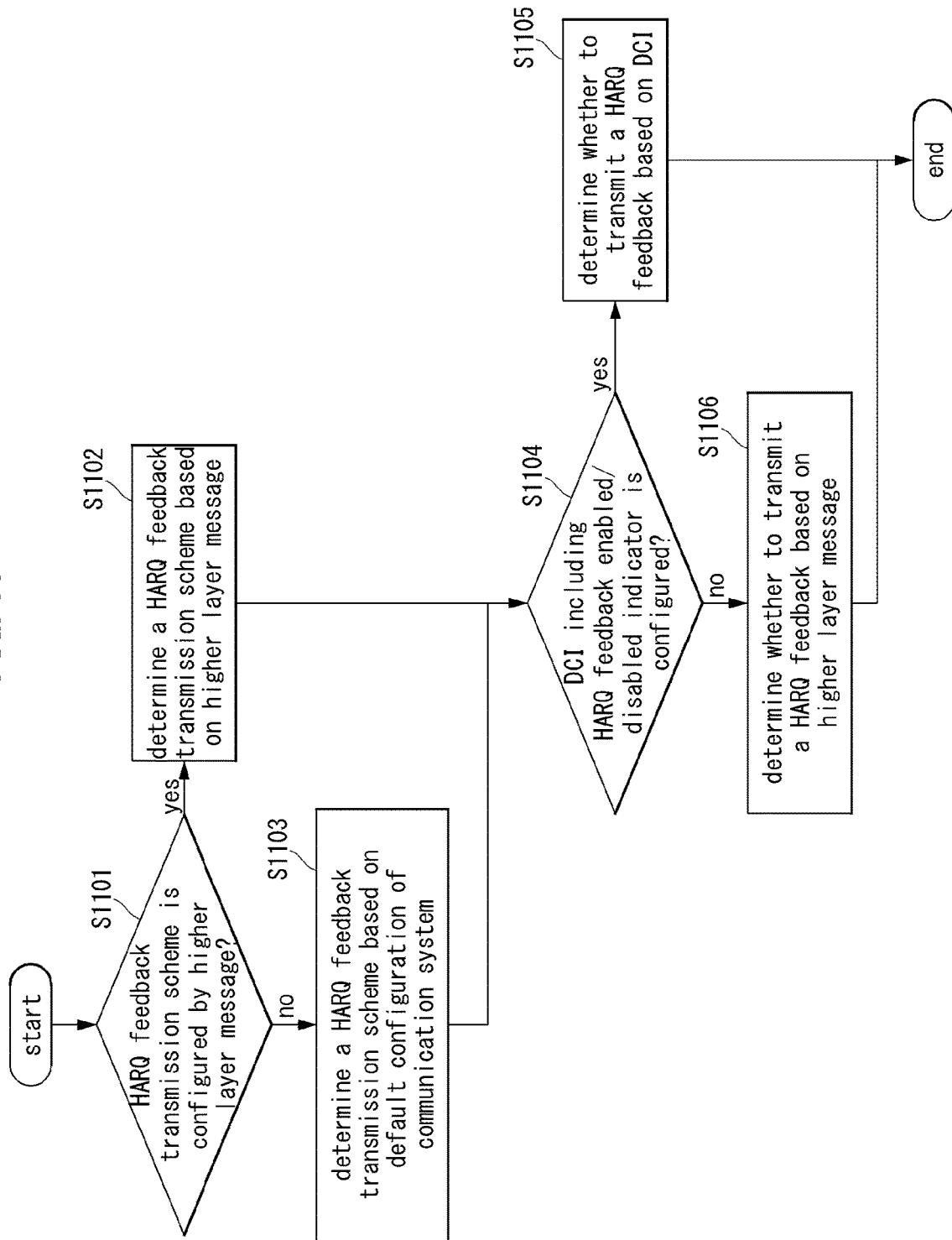
FIG. 11 is a sequence chart illustrating a second exemplary embodiment of a method for indicating enable/disable of HARQ feedback in a communication system.

FIG. 11 is a sequence chart illustrating a second exemplary embodiment of a method for indicating enable/disable of HARQ feedback in a communication system.

Referring to FIG. 11, a communication system may include a base station and a terminal. The base station may be the base station 110 shown in FIG. 1, and the terminal may be the first terminal 120 or the second terminal 130 shown in FIG. 1. Each of the base station and the terminal may be configured identically or similarly to the communication node 200 shown in FIG. 2.

The terminal may receive a higher layer message (e.g., RRC configuration information) from the base station, and may identify whether a HARQ feedback transmission scheme is configured based on information included in the higher layer message (S1101). When the HARQ feedback transmission scheme of the terminal is configured by the higher layer message, the terminal may determine the HARQ feedback transmission scheme based on the higher layer message (S1102). When the HARQ feedback transmission scheme of the terminal is not configured by the higher layer message, the terminal may determine the HARQ feedback transmission scheme based on a default configuration of the communication system (S1103). The default configuration of the communication system may be the 'ACK/NACK feedback scheme', 'NACK-only feedback scheme', or 'No HARQ feedback scheme'.

The terminal may receive the higher layer message from the base station, and may identify whether DCI including the HARQ feedback enabled/disabled indicator is configured based on information included in the higher layer message (S1104). When DCI including the HARQ feedback enabled/disabled indicator is configured, the terminal may determine whether to transmit a HARQ feedback based on the HARQ feedback enabled/disabled indicator included in the DCI (S1105). The higher layer message in the step S1104 may be the same as the higher layer message in the step S1101. Alternatively, the higher layer message in the step S1104 may be different from the higher layer message in the step S1101.

When the DCI including the HARQ feedback enabled/disabled indicator is not configured, the terminal may determine that whether to transmit a HARQ feedback is indicated by a higher layer message. The terminal may determine whether to transmit a HARQ feedback based on a higher layer message (S1106). The higher layer message in the step S1106 may be the same as the higher layer message in the step S1101. Alternatively, the higher layer message in the step S1106 may be different from the higher layer message in the step S1101.

When it is determined to transmit a HARQ feedback by the above-described operations, the terminal may transmit a HARQ feedback for a PDSCH (e.g., downlink data) to the base station. When it is determined not to transmit a HARQ feedback, the terminal may not transmit a HARQ feedback for a PDSCH (e.g., downlink data) to the base station. The above-described operations may be applied to a transmission procedure of HARQ feedback for common downlink data for one or more terminals.

On the other hand, the base station may indicate to the terminal whether to transmit a HARQ feedback by using a higher layer message, MAC layer message (e.g., MAC CE), and/or physical layer message (e.g., DCI).

When transmission of a HARQ feedback is indicated by a higher layer message, the terminal may transmit a HARQ feedback for downlink transmission. In this case, the HARQ feedback may be limited to a HARQ feedback for common downlink transmission for one or more terminals. When transmission of a HARQ feedback is configured by a higher layer message and transmission of a HARQ feedback is indicated by a physical layer message or MAC layer message, the terminal may transmit a HARQ response for downlink transmission. When transmission of a HARQ feedback is configured by a higher layer message and transmission of a HARQ feedback is not indicated by a physical layer message or MAC layer message, the terminal may not transmit a HARQ response for downlink transmission.

The base station may indicate (or configure) whether to transmit a HARQ feedback to the terminal by using a higher layer message (e.g., RRC configuration information). In addition, the base station may use a physical layer message (e.g., DCI) or a MAC layer message (e.g., MAC CE) to indicate (or configure) the HARQ feedback scheme (e.g., ACK/NACK feedback scheme or NACK-only feedback scheme) to the terminal.

When transmission of a HARQ feedback is indicated by a higher layer message and a HARQ feedback scheme is indicated by a physical layer message or MAC layer message, the terminal may transmit a HARQ feedback to the base station based on the HARQ feedback scheme indicated by the base station. When transmission of a HARQ feedback is not indicated by a higher layer message and a HARQ feedback scheme is indicated by a physical layer message or MAC layer message, the terminal may not transmit a HARQ feedback.

Alternatively, the base station may indicate (or, configure) the HARQ feedback scheme (e.g., ACK/NACK feedback scheme or NACK-only feedback scheme) to the terminal by using a higher layer message (e.g., RRC configuration information). In addition, the base station may indicate (or, configure) whether to transmit a HARQ feedback to the terminal by using a physical layer message (e.g., DCI) or MAC layer message (e.g., MAC CE).

When a HARQ feedback scheme is indicated by a higher layer message and the transmission of a HARQ feedback is indicated by a physical layer message or MAC layer message, the terminal may transmit a HARQ feedback based on the HARQ feedback scheme (e.g., ACK/NACK feedback scheme or NACK-only feedback scheme) indicated by the base station. When a HARQ feedback scheme is indicated by a higher layer message and transmission of a HARQ feedback is not indicated by a physical layer message or MAC layer message, the terminal may not transmit a HARQ feedback.

The base station may indicate (or configure) a HARQ feedback scheme to the terminal by using a higher layer message (e.g., RRC configuration information). Here, the HARQ feedback scheme may be the 'ACK/NACK feedback scheme', 'NACK-only feedback scheme', or 'no ACK/NACK feedback scheme'. When the no ACK/NACK feedback scheme is used, a HARQ feedback (e.g., ACK or NACK) may not be transmitted.

When a HARQ feedback scheme is indicated by a higher layer message, the terminal may perform a HARQ feedback procedure based on the HARQ feedback scheme (e.g., ACK/NACK feedback scheme, NACK-only feedback scheme, or no ACK/NACK feedback scheme) indicated by the base station. When the no ACK/NACK feedback scheme is indicated, a HARQ feedback may not be transmitted in the HARQ feedback procedure.

When the base station does not indicate a separate HARQ feedback scheme to the terminal, the terminal may transmit a HARQ feedback based on the ACK/NACK feedback scheme. In this case, a default HARQ feedback scheme may be the ACK/NACK feedback scheme. Alternatively, when the base station does not indicate a separate HARQ feedback scheme to the terminal, the terminal may transmit a HARQ feedback based on the NACK-only feedback scheme. In this case, the default HARQ feedback scheme may be the NACK-only feedback scheme. Alternatively, when the base station does not indicate a separate HARQ feedback scheme to the terminal, the terminal may use the no ACK/NACK feedback scheme. In this case, the default HARQ feedback scheme may be the no ACK/NACK feedback scheme.

When DCI including scheduling information of a PDSCH is received by using the MB-RNTI, the terminal may not transmit a HARQ feedback (i.e., ACK) for the PDSCH when a reception result of the PDSCH is ACK. When the reception result thereof is NACK, the terminal may transmit a HARQ feedback (i.e., NACK) for the PDSCH. That is, in the transmission procedure of the PDSCH according to DCI having the MB-RNTI, the NACK-only feedback scheme may be used.

When a group common PDCCH (e.g., group common DCI) including scheduling information of a PDSCH is received, the terminal may not transmit a HARQ feedback (i.e., ACK) for the PDSCH when a reception result of the PDSCH is ACK. When the reception result thereof is NACK, the terminal may transmit a HARQ feedback (i.e., NACK) for the PDSCH. That is, in the transmission procedure of the PDSCH according to the group common PDCCH, the NACK-only feedback scheme may be used.

The base station may transmit DCI scrambled by a UE-specific RNTI to one terminal. The terminal may receive the DCI by using the UE-specific RNTI, and may receive a PDSCH based on scheduling information included in the DCI. Here, the PDSCH may be scrambled by the UE-specific RNTI. The above-described transmission scheme may be referred to as a 'point to point (PTP) transmission scheme'.

The base station may transmit DCI scrambled by a group common RNTI to one or more terminals. The terminal(s) may receive the DCI by using the group common RNTI, and may receive a PDSCH based on scheduling information included in the DCI. Here, the PDSCH may be scrambled by the group common RNTI. The above-described transmission scheme may be referred to as a 'first point to multipoint (PTM) transmission scheme'.

The base station may transmit DCI scrambled by a UE-specific RNTI to terminal(s). The terminal(s) may receive the DCI using by the UE-specific RNTI, and may receive a PDSCH based on scheduling information included in the DCI. Here, the PDSCH may be scrambled by a group common RNTI. The above-described transmission scheme may be referred to as a 'second PTM transmission scheme'.

The base station may perform DL communication with one or more terminals based on the first PTM transmission scheme. The one or more terminals may receive downlink data from the base station based on the first PTM transmission scheme. The terminal may inform the base station of a reception result (e.g., HARQ feedback) for the downlink data received according to the first PTM transmission scheme. A retransmission procedure of the downlink data may be performed according to the reception result of the downlink data. The base station may perform a retransmission procedure for the downlink data. A retransmission procedure for the data according to the first PTM transmission scheme may be performed based on the first PTM transmission scheme. Accordingly, the terminal may receive retransmission data based on the first PTM transmission scheme.

Alternatively, the retransmission procedure for the data according to the first PTM transmission scheme may be performed based on the second PTM transmission scheme. When the reception result for the downlink data transmitted based on the first PTM transmission scheme is NACK, the base station may perform a retransmission procedure for the downlink data based on the second PTM transmission scheme. Accordingly, the terminal may receive retransmission data based on the second PTM transmission scheme.

Alternatively, the retransmission procedure for the data according to the first PTM transmission scheme may be performed based on the PTP transmission scheme. When the reception result for the downlink data transmitted based on the first PTM transmission scheme is NACK, the base station may perform a retransmission procedure for the downlink data based on the PTP transmission scheme. Accordingly, the terminal may receive retransmission data based on the PTP transmission scheme.

The base station may perform a retransmission procedure in the PTP transmission scheme by using a HARQ process ID and a new data indicator (NDI) for a transport block (TB) transmitted in the first PTM transmission scheme. The base station may perform the retransmission procedure for the first PTM transmission by performing PTP transmission using the same HARQ process ID as the HARQ process ID of the TB transmitted using the first PTM transmission scheme. The base station may perform the retransmission procedure in the PTP transmission scheme by using the HARQ process ID identical to the HARQ process ID of the TB transmitted through the first PTM transmission scheme and an NDI that is not toggled. The above-described HARQ process ID and NDI may be indicated to the terminal through scheduling DCI.

The terminal may receive retransmission data according to the PTP transmission scheme by using the HARQ process ID and NDI for the TB received through the first PTM transmission scheme. When the PTP transmission using the same HARQ process ID as the HARQ process ID of the TB received through the first PTM transmission scheme is performed, the terminal may determine that the PTP transmission is retransmission for the first PTM transmission. Alternatively, when PTP transmission using the HARQ process ID identical to the HARQ process ID of the TB received in the first PTM transmission scheme and an NDI that is not toggled is performed, the terminal may determine the PTP transmission as retransmission for the first PTM transmission. The above-described HARQ process ID and NDI may be indicated to the terminal through scheduling DCI.

The base station may perform DL communication with one or more terminals based on the second PTM transmission scheme. The one or more terminals may receive downlink data from the base station based on the second PTM transmission scheme. The terminal may inform the base station of a reception result (e.g., HARQ feedback) for the downlink data received according to the second PTM transmission scheme. A retransmission procedure of the downlink data may be performed according to the reception result of the downlink data. The base station may perform a retransmission procedure for the downlink data. A retransmission procedure for the data according to the second PTM transmission scheme may be performed based on the second PTM transmission scheme. Accordingly, the terminal may receive retransmission data based on the second PTM transmission scheme.

Alternatively, the retransmission procedure for the data according to the second PTM transmission scheme may be performed based on the first PTM transmission scheme. When the reception result for the downlink data transmitted based on the second PTM transmission scheme is NACK, the base station may perform a retransmission procedure for the downlink data based on the first PTM transmission scheme. Accordingly, the terminal may receive retransmission data based on the first PTM transmission scheme.

Alternatively, the retransmission procedure for the data according to the second PTM transmission scheme may be performed based on the PTP transmission scheme. When the reception result for the downlink data transmitted based on the second PTM transmission scheme is NACK, the base station may perform a retransmission procedure for the downlink data based on the PTP transmission scheme. Accordingly, the terminal may receive retransmission data based on the PTP transmission scheme.

The base station may perform a retransmission procedure in the PTP transmission scheme by using a HARQ process ID and a new data indicator (NDI) for a TB transmitted in the second PTM transmission scheme. The base station may perform a retransmission procedure for the second PTM transmission by performing PTP transmission using the same HARQ process ID as the HARQ process ID of the TB transmitted using the second PTM transmission scheme. The base station may perform the retransmission procedure in the PTP transmission scheme by using the HARQ process ID identical to the HARQ process ID of the TB transmitted through the second PTM transmission scheme and an NDI that is not toggled. The above-described HARQ process ID and NDI may be indicated to the terminal through scheduling DCI.

The terminal may receive retransmission data according to the PTP transmission scheme by using the HARQ process ID and NDI for the TB received through the second PTM transmission scheme. When the PTP transmission using the same HARQ process ID as the HARQ process ID of the TB received through the second PTM transmission scheme is performed, the terminal may determine that the PTP transmission is retransmission for the second PTM transmission. Alternatively, when PTP transmission using the HARQ process ID identical to the HARQ process ID of the TB received in the second PTM transmission scheme and an NDI that is not toggled is performed, the terminal may determine the PTP transmission as retransmission for the second PTM transmission. The above-described HARQ process ID and NDI may be indicated to the terminal through scheduling DCI.

Meanwhile, the base station may perform periodic DL communication as in the exemplary embodiment shown in FIG. 8. Common DL communication for one or more terminals may be performed periodically. A HARQ feedback for periodic DL communication may be transmitted based on the ACK/NACK feedback scheme or the NACK-only feedback scheme. A HARQ feedback for periodic DL communication may not be performed according to system configuration.

The HARQ feedback scheme for periodic DL communication may be determined based on a configuration for the periodic DL communication using a higher layer message. The terminal may determine the HARQ feedback scheme for the periodic DL transmission by using HARQ feedback scheme-related information among configuration information for the periodic DL communication.

The HARQ feedback scheme for the periodic DL communication may be indicated through an activation message of the periodic DL communication. The terminal may determine the HARQ feedback scheme for the periodic DL transmission by using the HARQ feedback scheme indicated through the activation message of the periodic DL communication.

The base station may perform a retransmission procedure for the periodic DL communication of one or more terminals. In this case, the base station may perform the retransmission procedure based on the PTP transmission scheme. In the retransmission procedure, the base station may transmit a PDSCH scrambled by the CS-RNTI. In addition, the base station may transmit a toggled NDI for the retransmission.

When periodic DL communication is performed, the terminal may transmit a reception result (e.g., HARQ feedback) for downlink data to the base station. When the reception result for the downlink data is NACK, the terminal may perform a reception operation of retransmission data. The retransmission data for the periodic DL communication may be received based on the PTP transmission scheme. The terminal may receive the retransmission data by using the CS-RNTI. When the NDI for the received PDSCH by using the CS-RNTI is toggled, the terminal may determine that the PDSCH is a retransmission PDSCH for the periodic DL communication.

When the same PDSCH for one or more terminals is scheduled, the base station may configure a separate feedback resource for the PDSCH, and transmit a higher layer message (e.g., RRC configuration information) including configuration information of the feedback resource to the terminal. The terminal may identify the feedback resource by receiving the higher layer message. When the feedback resource is configured by the higher layer message, the terminal may transmit a HARQ feedback for the PDSCH by using the feedback resource.

When a PDSCH is scheduled by a group common PDCCH, the terminal may transmit a HARQ feedback for the PSDCH by using a separate feedback resource. When a PDSCH is scheduled by the MB-RNTI, the terminal may transmit a HARQ feedback for the PSDCH by using a separate feedback resource.

When a HARQ feedback transmission for an individual PDSCH and a HARQ feedback transmission for a common PDSCH collide in the same time period, the terminal may transmit the HARQ feedback for the individual PDSCH. Alternatively, when a HARQ feedback transmission for an individual PDSCH and a HARQ feedback transmission for a common PDSCH collide in the same time period, the terminal may not transmit the HARQ feedback for the individual PDSCH. Here, the individual PDSCH may mean a PDSCH transmitted to one terminal, and the common PDSCH may mean a PDSCH transmitted to a plurality of terminals.

Alternatively, when a HARQ feedback transmission for an individual PDSCH and a HARQ feedback transmission for a common PDSCH collide in the same time period, the terminal may transmit the HARQ feedback for the common PDSCH. Alternatively, when a HARQ feedback transmission for an individual PDSCH and a HARQ feedback transmission for a common PDSCH collide in the same time period, the terminal may not transmit HARQ feedback for the common PDSCH.

When a HARQ feedback transmission for an individual PDSCH and a HARQ feedback transmission for a common PDSCH are required in the same time period, the terminal may concatenate the HARQ feedback for the individual PDSCH and the HARQ feedback for the common PDSCH, thereby generating one HARQ feedback (e.g., HARQ codebook). In the HARQ codebook, the HARQ feedback (e.g., HARQ information bit) for the individual PDSCH may be located in the front region, and the HARQ feedback (e.g., HARQ information bit) for the common PDSCH may be located after the HARQ feedback for the individual PDSCH. Alternatively, in the HARQ codebook, the HARQ feedback for the common PDSCH may be located in the front region, and the HARQ feedback for the individual PDSCH may be located after the HARQ feedback for the common PDSCH. A position at which the HARQ information bit is disposed within the HARQ feedback may vary according to a priority.

The base station may allocate a separate downlink assignment index (DAI) to each of the individual PDSCH and the common PDSCH. The DAI configured by the base station may be transmitted to the terminal through DCI. The terminal may determine that a separate DAI exists for each of the individual PDSCH and the common PDSCH, and may interpret the DAI based thereon.

The base station may set a priority for transmission of a common PDSCH. In addition, the base station may set a priority for HARQ-ACK transmission (e.g., HARQ feedback transmission) corresponding to a common PDSCH. The base station may indicate (or set) priority information of transmission of a common PDSCH and/or priority information of HARQ-ACK transmission for a common PDSCH to the terminal. The terminal may receive the priority information of transmission of a common PDSCH and/or the priority information of the HARQ-ACK transmission for a common PDSCH from the base station. The above-described priority information may be transmitted to the terminal by using at least one of a higher layer message (e.g., RRC configuration information), MAC CE, or DCI (e.g., DCI for scheduling the common PDSCH).

The base station may indicate to the terminal whether the priority information of transmission of a common PDSCH and/or the priority information of HARQ-ACK transmission for a common PDSCH is included in DCI through a higher layer message (e.g., RRC configuration information). When it is indicated through the higher layer message that the priority information is included in the DCI, the base station may transmit the DCI including the priority information. The DCI may be DCI for scheduling a common PDSCH. When it is not indicated that the priority information is to be included in DCI through the higher layer message (i.e., when a separate higher layer message indicating whether the priority information is included in DCI is not transmitted), the base station may transmit DCI without the priority information. If the priority of a common PDSCH is not indicated through DCI, the terminal may determine that the priority of a common PDSCH is low.

The terminal may receive, from the base station, the information indicating whether the priority information of transmission of a common PDSCH and/or the priority information of HARQ-ACK transmission for a common PDSCH is included in DCI through the higher layer message. When it is indicated through the higher layer message that the priority information is included in DCI, the terminal may identify the priority information through a field in DCI. The terminal may identify the priority information in DCI for scheduling a common PDSCH, and may determine that the priority information is a priority related to a PDSCH scheduled by the DCI. The terminal may transmit a HARQ-ACK for the common PDSCH based on the priority information. The terminal may perform a HARQ-ACK codebook generation operation or a HARQ-ACK multiplexing operation by using the priority information.

When the separate higher layer message indicating whether the priority information is included in DCI is not received, the terminal may determine that the priority information is not included in DCI. When the separate higher layer message is not received, the terminal may determine the priority of transmission of a common PDSCH and/or the priority of HARQ-ACK transmission for a common PDSCH as a low priority. When the separate higher layer message indicating whether the priority information is included in DCI is not received, the terminal may determine the priority for a common PDSCH as a low priority, and transmit a HARQ-ACK therefor based on the determined priority. The terminal may perform a HARQ-ACK codebook generation operation or a HARQ-ACK multiplexing operation by using the priority information.

The base station may instruct the terminal to transmit a plurality of HARQ-ACKs in one uplink time period. In this case, the terminal may transmit a HARQ-ACK based on priority information in the one uplink time period. The base station may instruct the terminal to transmit HARQ-ACK(s) for one or more common PDSCHs in the same uplink time period. In this case, the terminal may transmit a HARQ-ACK based on priority information indicated by the base station. When a priority of a first common PDSCH is the same as a priority of a second common PDSCH in the same uplink time period, the terminal may multiplex a HARQ-ACK of the first common PDSCH and a HARQ-ACK of the second common PDSCH, thereby generating multiplexed HARQ-ACKs, and transmit the multiplexed HARQ-ACKs. The multiplexed HARQ-ACKs may be a HARQ codebook.

When the priority of the first common PDSCH is different from the priority of the second common PDSCH in the same uplink time period, the terminal may multiplex the HARQ-ACK of the first common PDSCH and the HARQ-ACK of the second common PDSCH, thereby generating multiplexed HARQ-ACKs, and transmit the multiplexed HARQ-ACKs. When the priority of the first common PDSCH is higher than the priority of the second common PDSCH in the same uplink time period, the terminal may transmit the HARQ-ACK for the first common PDSCH, and may drop transmission of the HARQ-ACK for the second common PDSCH. When the priority of the first common PDSCH is different from the priority of the second common PDSCH in the same uplink time period, the terminal may transmit a HARQ-ACK according to a preset rule.

The base station may transmit a common PDSCH and an individual PDSCH, and the terminal may receive the common PDSCH and the individual PDSCH from the base station. The common PDSCH and the individual PDSCH may be transmitted/received in one time period.

The base station may instruct (or configure) the terminal to transmit a HARQ-ACK for the common PDSCH and a HARQ-ACK for the individual PDSCH in one time period. The above-described operation may be indicated through a higher layer message, a MAC layer message, and/or a physical layer message. The terminal may transmit the HARQ-ACK for the common PDSCH and/or the HARQ-ACK for the individual PDSCH in one time period based on the indication of the base station. In this case, the terminal may transmit the HARQ-ACK(s) based on the priority information indicated by the base station.

When the priority for the common PDSCH is the same as the priority for the individual PDSCH, the terminal may multiplex the HARQ-ACK for the common PDSCH and the HARQ-ACK for the individual PDSCH, thereby generating multiplexed HARQ-ACKs, and transmit the multiplexed HARQ-ACKs. Alternatively, when the priority for the common PDSCH is the same as the priority for the individual PDSCH, the terminal may transmit the HARQ-ACK for the individual PDSCH and may not transmit the HARQ-ACK for the common PDSCH.

When the priority for the common PDSCH is different from the priority for the individual PDSCH, the terminal may generate multiplexed HARQ-ACKs by multiplexing the HARQ-ACK for the common PDSCH and the HARQ-ACK for the individual PDSCH, and transmit the multiplexed HARQ-ACKs. Alternatively, when the priority for the common PDSCH is different from the priority for the individual PDSCH, the terminal may transmit the HARQ-ACK for the PDSCH having a higher priority (e.g., common PDSCH or individual PDSCH), and may transmit the HARQ-ACK for the PDSCH having a lower priority. Alternatively, when the priority for the common PDSCH is different from the priority for the individual PDSCH, the terminal may transmit the HARQ-ACK(s) according to a preset rule.

Hereinafter, methods of determining a transmission resource of a HARQ-ACK will be described. In a downlink transmission procedure, the base station may indicate (or configure) a transmission resource of a HARQ-ACK for downlink data to the terminal. The base station may indicate the transmission resource of the HARQ-ACK by using DCI for scheduling downlink transmission. The terminal may receive information on the transmission resource of the HARQ-ACK from the base station. The information on the transmission resource of the HARQ-ACK may be included in scheduling DCI received from the base station.

The information on the transmission resource of the HARQ-ACK (hereinafter, 'HARQ-ACK transmission resource information') may include time resource information. The time resource information may indicate a time period and/or a slot (e.g., a slot index, the number of slots) in which the HARQ-ACK is transmitted. Also, the time resource information may include an offset. The offset may indicate an interval (e.g., the number of slots) between a slot in which the DCI is transmitted and a slot in which the HARQ-ACK is transmitted. The terminal may identify the time resource information (e.g., time period, slot information, offset) of the HARQ-ACK, and may determine a time resource for transmitting the HARQ-ACK based on the time resource information.

The HARQ-ACK transmission resource information may further indicate other information as well as the time slot in which the HARQ-ACK is transmitted. For example, the HARQ-ACK transmission resource information may further include at least one of a format used for transmission of the HARQ-ACK, time information in units of symbols, and sequence related information. The base station may transmit DCI including the HARQ-ACK transmission resource information to the terminal. For example, the HARQ-ACK transmission resource information may be indicated by a PUCCH resource indicator (PRI) field included in the DCI.

The terminal may receive the HARQ-ACK transmission resource information from the base station, and identify the information included in the HARQ-ACK transmission resource information (e.g., time slot, format used for transmission of the HARQ-ACK, time information in units of symbols, and/or sequence related information). The HARQ-ACK transmission resource information may be indicated by the DCI (e.g., PRI field included in the DCI) received from the base station.

Hereinafter, when a HARQ-ACK transmission resource for an individual PDSCH and a HARQ-ACK transmission resource for a common PDSCH are configured in the same time slot, HARQ-ACK transmission methods will be described.

Figure 12:
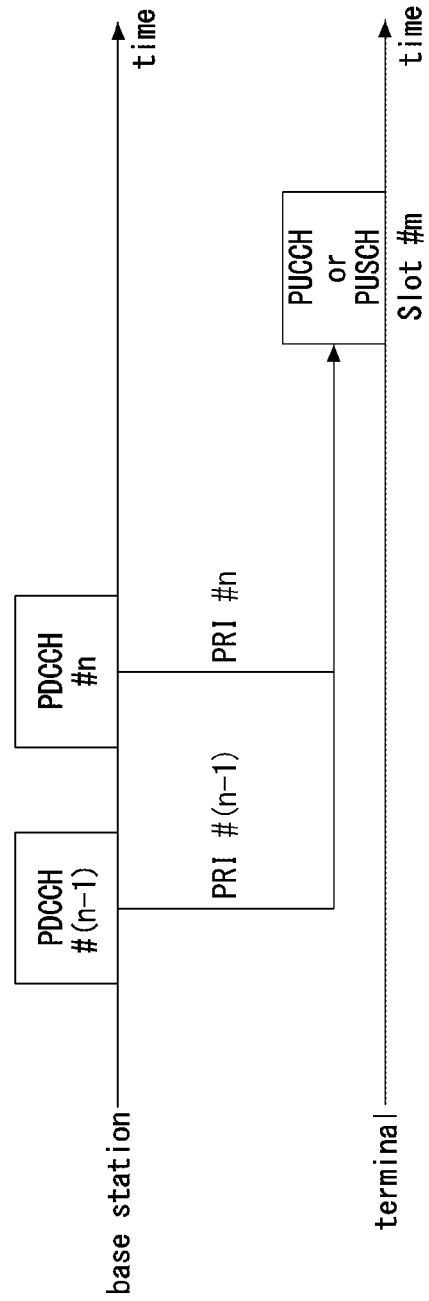
FIG. 12 is a conceptual diagram illustrating a second exemplary embodiment of a method for transmitting feedback information in a communication system.

FIG. 12 is a conceptual diagram illustrating a second exemplary embodiment of a method for transmitting feedback information in a communication system.

Referring to FIG. 12, the base station may transmit a PDCCH (e.g., DCI) for scheduling of a PDSCH to the terminal. The PDCCH may include HARQ-ACK transmission resource information for transmission of the PDSCH. The HARQ-ACK transmission resource information may include at least one of information on a time slot in which a HARQ-ACK is transmitted and a PRI. The terminal may receive the PDCCH for scheduling the PDSCH transmission from the base station. The terminal may identify the HARQ-ACK transmission resource information for the PDSCH through the PDCCH.

The base station may transmit a PDCCH #n after transmitting a PDCCH #(n−1). A transmission resource (e.g., slot #m) of a HARQ-ACK indicated by the newly transmitted PDCCH #n may be the same as a transmission resource (e.g., slot #m) of a HARQ-ACK indicated by the previously transmitted PDCCH #(n−1). Each of n and m may be a natural number. The base station may indicate (or configure) one slot (e.g., slot #m) as transmission resources of HARQ-ACKs for a plurality of PDSCHs. The plurality of PDSCHs may include a PDSCH #(n−1) scheduled by the PDCCH #(n−1) and a PDSCH #n scheduled by the PDCCH #n. In this case, one of the plurality of PDSCHs may be a common PDSCH, and another may be an individual PDSCH.

The terminal may receive the PDCCH #(n−1), and may receive the PDCCH #n after the PDCCH #(n−1). The transmission resource (e.g., slot #m) of the HARQ-ACK indicated by the PDCCH #n may be the same as the transmission resource (e.g., slot #m) of the HARQ-ACK indicated by the PDCCH #(n−1). That is, one slot (e.g., slot #m) may be indicated (or configured) as transmission resources of HARQ-ACKs for a plurality of PDSCHs. In this case, the terminal may multiplex HARQ-ACKs for the plurality of PDSCHs (e.g., common PDSCH and individual PDSCH), and may transmit the multiplexed HARQ-ACKs in the one slot.

The base station may transmit the PDCCH #(n−1) including a PRI #(n−1) and the PDCCH #n including a PRI #n. According to the plurality of PDCCHs (e.g., PDCCH #(n−1) and PDCCH #n), one slot (e.g., slot #m) may be indicated as transmission resources of HARQ-ACKs for a plurality of PDSCHs. For example, the PRI #(n−1) may the indicate slot #m, and the PRI #n may indicate the slot #m.

In this case, it may be assumed that HARQ-ACK transmission may be performed by the PRI #n included in the PDCCH #n transmitted later among the plurality of PDCCHs (e.g., a plurality of PDCCHs for scheduling individual PDSCHs). The terminal may receive the PDCCH #(n−1) and the PDCCH #n from the base station, and may identify the PRI included in each of the PDCCH #(n−1) and the PDCCH #n. When one slot is indicated as the transmission resources of HARQ-ACKs for the plurality of PDSCHs, the terminal may transmit a HARQ-ACK based on the PRI #n included in the PDCCH #n received later among the plurality of PDCCHs (e.g., the plurality of PDCCHs for scheduling individual PDSCHs. As another method, when one slot is indicated as transmission resources of HARQ-ACKs for a plurality of PDSCHs (e.g., a plurality of different types of PDSCHs), the terminal may transmit a HARQ-ACK based on the PRI #n included in the PDCCH #n received later regardless of the types of the plurality of PDSCHs (e.g., common PDSCH or individual PDSCH).

Alternatively, when the priority of the common PDSCH is higher than that of the individual PDSCH, the terminal may transmit only the common PDSCH in the slot #m, and may drop transmission of the individual PDSCH. When the priority of the common PDSCH is lower than that of the individual PDSCH, the terminal may transmit only the individual PDSCH in the slot #m, and drop transmission of the common PDSCH.

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a communication system, the operation method comprising:
receiving, from a base station, a higher layer message including information indicating that first downlink control information (DCI) including a hybrid automatic repeat request (HARQ) feedback enabled/disabled indicator is configured;
receiving the first DCI including the HARQ feedback enabled/disabled indicator and first scheduling information from the base station when the first DCI including the HARQ feedback enabled/disabled indicator is configured by the higher layer message;
receiving first downlink data from the base station based on the first scheduling information included in the first DCI; and
determining whether to transmit a first HARQ response for the first downlink data based on the HARQ feedback enabled/disabled indicator included in the first DCI,
wherein, when the first DCI including the HARQ feedback enabled/disabled indicator is not configured by the higher layer message, the first DCI does not include the HARQ feedback enabled/disabled indicator,
when the HARQ feedback enabled/disabled indicator indicates enabling of HARQ feedback, the first HARQ response is transmitted to the base station, and
when the HARQ feedback enabled/disabled indicator indicates disabling of the HARQ feedback, the first HARQ response is not transmitted to the base station.

2. The operation method according to claim 1, wherein the higher layer message or the first DCI further includes information indicating a HARQ feedback scheme; when the HARQ feedback scheme is acknowledgement (ACK)/negative ACK (HACK) feedback scheme, the first HARQ response transmitted to the base station includes ACK or NACK; and when the HARQ feedback scheme is a NACK-only feedback scheme, the first HARQ response transmitted to the base station includes only NACK.

3. The operation method according to claim 1, further comprising:
receiving second DCI from the base station;
receiving second downlink data from the base station based on second scheduling information included in the second DCI;
generating multiplexed HARQ responses by multiplexing the first HARQ response and a second HARQ response for the second downlink data; and
transmitting the multiplexed HARQ responses to the base station through a same slot,
wherein a first feedback resource indicated by the first DCI and a second feedback resource indicated by the second DCI are configured in the same slot.

4. The operation method according to claim 3, wherein the multiplexed HARQ responses are a HARQ codebook, and arrangement of the multiplexed HARQ responses within the HARQ codebook is determined according to each type of the first downlink data and the second downlink data.

5. The operation method according to claim 1, further comprising:
receiving second DCI from the base station;
receiving second downlink data from the base station based on second scheduling information included in the second DCI; and
when a first feedback resource indicated by the first DCI and a second feedback resource indicated by the second DCI are configured in a same slot, transmitting a HARQ response for one downlink data having a higher priority among the first downlink data and the second downlink data to the base station through the same slot.

6. The operation method according to claim 5, wherein a priority of each of the first downlink data and the second downlink data varies according to a type of each downlink data, the type of each downlink data is classified into individual downlink data and common downlink data, the individual downlink data is downlink data transmitted to one terminal, and the common downlink data is downlink data transmitted to a plurality of terminals.

7. The operation method according to claim 1, further comprising:
receiving second DCI from the base station;
receiving second downlink data from the base station based on second scheduling information included in the second DCI; and
transmitting, to the base station, at least one HARQ response among the first HARQ response and a second HARQ response for the second downlink data by using a HARQ feedback resource indicated by one DCI received later in a time domain among the first DCI and the second DCI.

8. The operation method according to claim 1, wherein the first downlink data is individual downlink data transmitted to one terminal or common downlink data transmitted to a plurality of terminals, and priority information of the individual downlink data and priority information of the common downlink data are included in the higher layer message.

9. An operation method of a terminal in a communication system, the operation method comprising:
receiving, from a base station, a first higher layer message including information indicating that downlink control information (DCI) including a hybrid automatic repeat request (HARQ) feedback enabled/disabled indicator is not configured;
receiving, from the base station, a second higher layer message including information indicating whether to transmit a HARQ feedback;
receiving a first DCI without the HARQ feedback enabled/disabled indicator from the base station when the first DCI including the HARQ feedback enabled/disabled indicator is not configured by the first higher layer message;
receiving downlink data from the base station based on scheduling information included in the first DCI; and
determining whether to transmit a HARQ response for the downlink data based on the information included in the second higher layer message,
wherein, when the first DCI including the HARQ feedback enabled/disabled indicator is configured by the first higher layer message, the first DCI includes the HARQ feedback enabled/disabled indicator,
when the second higher layer message indicates transmission of the HARQ feedback, the HARQ response is transmitted, and
when the second higher layer message does not indicate transmission of the HARQ feedback, whether to transmit the HARQ response is determined based on a default configuration of the communication system.

10. The operation method according to claim 9, wherein the first higher layer message, the second higher layer message, or the first DCI further includes information indicating a HARQ feedback scheme; when the HARQ feedback scheme is acknowledgement (ACK)/negative ACK (NACK) feedback scheme, the HARQ response transmitted to the base station includes ACK or NACK; and when the HARQ feedback scheme is a NACK-only feedback scheme, the HARQ response transmitted to the base station includes only NACK.

11. The operation method according to claim 9, wherein when a HARQ feedback scheme of the HARQ response is not indicated by the base station, the HARQ response is transmitted based on a default HARQ feedback scheme, and the default HARQ feedback scheme is an ACK/NACK feedback scheme or a NACK-only feedback scheme.

12. The operation method according to claim 9, wherein the first DCI further includes a physical uplink control channel (PUCCH) resource indicator (PRI) indicating a HARQ feedback resource, and the HARQ response is transmitted in the HARQ feedback resource indicated by the PRI.

13. An operation method of a base station in a communication system, the operation method comprising:
  transmitting, to a terminal, a higher layer message including information indicating that first downlink control information (DCI) including a hybrid automatic repeat request (HARQ) feedback enabled/disabled indicator is configured;
  transmitting the first DCI including the HARQ feedback enabled/disabled indicator and first scheduling information to the terminal when the first DCI including the HARQ feedback enabled/disabled indicator is configured by the higher layer message;
  transmitting first downlink data to the terminal based on the first scheduling information; and
  determining whether to perform a reception operation of a first HARQ response for the first downlink data based on the HARQ feedback enabled/disabled indicator,
  wherein, when the first DCI including the HARQ feedback enabled/disabled indicator is not configured by the higher layer message, the first DCI does not include the HARQ feedback enabled/disabled indicator,
  when the HARQ feedback enabled/disabled indicator indicates enabling of HARQ feedback, the reception operation of the first HARQ response is performed, and
  when the HARQ feedback enabled/disabled indicator indicates disabling of HARQ feedback, the reception operation of the first HARQ response is not performed.

14. The operation method according to claim 13, wherein the higher layer message or the first DCI further includes information indicating a HARQ feedback scheme; when the HARQ feedback scheme is acknowledgement (ACK)/negative ACK (NACK) feedback scheme, the HARQ response includes ACK or NACK; and when the HARQ feedback scheme is a NACK-only feedback scheme, the HARQ response includes only NACK.

15. The operation method according to claim 13, further comprising:
  transmitting second DCI including second scheduling information to the terminal;
  transmitting second downlink data to the terminal based on the second scheduling information; and
  when a first feedback resource indicated by the first DCI and a second feedback resource indicated by the second DCI are configured in a same slot, receiving, from the terminal, the first HARQ response and a second HARQ response for the second downlink data in the same slot,
  wherein the first HARQ response and the second HARQ response are multiplexed in the same slot.

16. The operation method according to claim 13, further comprising:
  transmitting second DCI including second scheduling information to the terminal;
  transmitting second downlink data to the terminal based on the second scheduling information; and
  when a first feedback resource indicated by the first DCI and a second feedback resource indicated by the second DCI are configured in a same slot, receiving, from the terminal, a HARQ response for one downlink data having a higher priority among the first downlink data and the second downlink data in the same slot.

17. The operation method according to claim 13, wherein the first downlink data is individual downlink data transmitted to one terminal or common downlink data transmitted to a plurality of terminals, and priority information of the individual downlink data and priority information of the common downlink data are included in the higher layer message.

* * * * *